United States Patent
Song et al.

(10) Patent No.: US 9,116,662 B1
(45) Date of Patent: Aug. 25, 2015

(54) IMAGE DISPLAY DEVICE

(71) Applicant: LG Electronics Inc., Seoul (KR)

(72) Inventors: Hyeoncheol Song, Seoul (KR); Seokwon Park, Seoul (KR); Kyueung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/454,018

(22) Filed: Aug. 7, 2014

(30) Foreign Application Priority Data

Apr. 23, 2014 (KR) .................. 10-2014-0048867

(51) Int. Cl.
*G06F 1/16* (2006.01)
*G09G 3/00* (2006.01)

(52) U.S. Cl.
CPC ............ *G06F 1/1601* (2013.01); *G06F 1/1605* (2013.01); *G09G 3/001* (2013.01)

(58) Field of Classification Search
CPC combination set(s) only.
See application file for complete search history.

(56) References Cited

U.S. PATENT DOCUMENTS

| | | | |
|---|---|---|---|
| 2006/0107566 A1* | 5/2006 | Van Rens | 40/515 |
| 2010/0141605 A1* | 6/2010 | Kang et al. | 345/174 |
| 2010/0277860 A1* | 11/2010 | Jeong et al. | 361/679.27 |
| 2013/0169520 A1* | 7/2013 | Cho et al. | 345/156 |
| 2014/0101560 A1* | 4/2014 | Kwak et al. | 715/738 |
| 2014/0202014 A1* | 7/2014 | Choi et al. | 33/303 |

* cited by examiner

*Primary Examiner* — Van Chow
(74) *Attorney, Agent, or Firm* — Dentons US LLP

(57) ABSTRACT

An image display device includes a flexible display unit bendable by external force from a first state to a second state, the second state being a bent state; pressing members disposed on a rear surface of the flexible display unit and to apply the external force to the flexible display unit; a driving unit to generate a driving force to provide the external force to the pressing members such that bending of the flexible display unit is implemented; and a sensing unit to sense a degree of bending of the flexible display unit to provide a basis for determining a direction of the driving force.

18 Claims, 12 Drawing Sheets

IMAGE DISPLAY DEVICE

CROSS REFERENCE TO RELATED APPLICATIONS

Pursuant to 35 U.S.C. §119(a), this application claims the benefit of earlier filing date and right of priority to Korean Application No. 10-2014-0048867, filed on Apr. 23, 2014, the contents of which is incorporated by reference herein in its entirety.

BACKGROUND

1. Field of the Disclosure

The present disclosure relates to an image display device having a flexible display unit, and more particularly, to an image display device capable of accurately controlling multi-step variable driving of a flexible display unit.

2. Background

In general, an image display device (apparatus) includes both a device of recording and/or reproducing images and a device of recording and/or reproducing audio. Examples of the image display device may include a TV set, a monitor, a projector, a tablet, a smart phone and the like.

As it becomes multifunctional, the image display device can be allowed to capture still images or moving images, play music or video files, play games, receive broadcasts and the like, so as to be implemented as an integrated multimedia player.

Many efforts are undergoing to support and enhance various functions such as multimedia player in view of hardware or software improvements. As one example of the structural change and improvement, various studies and proposals for an image display device having a flexible display device which is transformable in shape are undergoing.

In particular, when a flexible display unit is bent toward users, pixels may be disposed at a relatively uniform position with respect to user's vision, and thus, an image display device having such a flexible display unit may deliver more realistic visual information to the user and provide a viewing environment arousing a sense of immersion.

A flexible display unit is similar to the related art display unit in that it outputs images, but is different in that a flexible display unit is deformed by external force, and structural changes utilizing the deformation characteristics have been variously attempted in image display devices.

As a structural change, the need for a structure capable of restoring a flexible display unit to a state before being deformed, as well as deforming the flexible display unit according to user demand, has increased. Also, research into image display devices that may implement a flexible display unit having an accurate radius of curvature in deforming the flexible display unit in multiple stages according to a control command from a user has been conducted.

However, a structure for accurately controlling deformation of a flexible display unit in multiple stages is yet to be proposed and has not been established as standards.

SUMMARY

One aspect is to provide an image display device having a flexible display unit that is accurately controlled during bending.

Another aspect is to provide an image display device having a flexible display unit that is accurately deformed in multiple steps based on information regarding a radius of curvature of the flexible display unit sensed by a sensing unit.

Another aspect is to provide a variable driving structure configured in the middle of a flexible display unit and a variable driving structure configured in the left or right of the flexible display unit, and proposes an image display device having a scheme of measuring a radius of curvature appropriate therefor.

To achieve these and other advantages, as embodied and broadly described herein, the present disclosure provides in one aspect an image display device including: a flexible display unit bendable by external force from a first state to a second state, the second state being a bent state; pressing members disposed on a rear surface of the flexible display unit and to apply the external force to the flexible display unit; a driving unit to generate a driving force to provide the external force to the pressing members such that bending of the flexible display unit is implemented; and a sensing unit to sense a degree of bending of the flexible display unit to provide a basis for determining a direction of the driving force.

According to an exemplary embodiment related to the present disclosure, the image display device may further include: adjusting units coupled to the pressing members and the driving unit to provide driving force of the driving unit to the pressing members such that the pressing members move in a direction away from the driving unit or in a direction toward the driving unit based on the direction of the driving force.

The driving unit may be installed at the middle of the flexible display unit to push on or pull on the adjusting units, and the pressing members symmetrically extending in the horizontal direction from a side of the respective adjusting units and an end portion of the pressing members are coupled to the rear surface of the flexible display unit, and as the driving unit pushes on the adjusting units, at least a portion of the pressing members bends to apply the external force to the rear surface of the flexible display unit.

The image display device may further include deformation limiting units to prevent the pressing members from parting away from the rear surface of the flexible display unit, while being bent, the respective deformation limiting unit may be disposed between the end portion of the pressing member and the adjusting unit and coupled to the flexible display unit, while holding the pressing member to the rear surface of the flexible display unit.

The driving unit may include: a driving motor to generate the driving force along a driving shaft; a bevel gear to change the driving force along the driving shaft to the external force in a movement direction of the adjusting units; and a lead screw coupled to the bevel gear so as to be rotated by driving force of the driving shaft and screw-coupled with the adjusting units to move the adjusting units in a direction away from the driving unit or in a direction toward the driving unit according to a rotational direction of the driving shaft.

Each of the adjusting units may include: a screw nut screw-coupled to the lead screw so as to relatively rotate with respect to the lead screw; and a moving body accommodating the screw nut, coupled to the pressing member, and slidably moving in a direction away from the driving unit or in a direction toward the driving unit according to relative rotation of the lead screw and the screw nut.

The image display device may further include: a guide portion formed along an extending direction of the moving body to guide a slidable movement of the moving body.

The screw nut may have a manipulation portion located at one surface of the moving body and rotatably manipulated to be relatively moved with respect to the lead screw.

Position of at least one adjusting unit may vary depending on a degree of bending of the flexible display unit, and the sensing unit may include a linear position sensor configured to generate different electrical signals according to positions of the adjusting units to sense a degree of bending of the flexible display unit based on the position of the adjusting unit.

The linear position sensor may include: a housing installed at the rear surface of the flexible display unit; a link coupled to the adjusting units to move together with the adjusting units; and a linear switch having one end coupled to the link and the other end slidably moving within the housing according to a movement of the link, wherein the linear position sensor may generate different voltages according to distances from a reference position to the linear switch.

A rotation angle of the driving motor and a rotation angle of the lead screw may vary according to a degree of bending of the flexible display unit, and the sensing unit may sense a degree of bending of the flexible display unit based on at least one of a rotation angle of the driving motor and a rotation angle of the lead screw.

The image display device may further include: a controller configured to control the driving unit to move the adjusting units, wherein when a control command for changing a degree of bending of the flexible display unit is received, the controller may compare a target radius of curvature based on the control command and a current radius of curvature of the flexible display unit sensed by the sensing unit to determine a movement direction and a movement distance of the adjusting units.

When the target radius of curvature based on the control command is smaller than the current radius of curvature sensed by the sensing unit, the controller may control the driving unit to move the adjusting units in a direction toward the driving unit, and when the target radius of curvature based on the control command is greater than the current radius of curvature sensed by the sensing unit, the controller may control the driving unit to move the adjusting units in a direction away from the driving unit.

The controller may be configured to continuously receive feedback of information regarding a current radius of curvature of the flexible display unit from the sensing unit until when the current radius of curvature of the flexible display unit reaches the target radius of curvature.

The image display device may further include a rear cover formed to cover the rear surface and a lateral surface of the flexible display unit, wherein the driving unit includes a pole at a left side and another pole at a right side of the flexible display unit, and pressing members on respective poles may apply external force to the rear surface of the flexible display unit upon receiving driving force from the driving unit.

Reference positions for distance measurement may be set on the rear of the left and right sides of the flexible display unit, and the sensing units may be installed at the reference positions to measure distances from the reference positions to the rear surface of the flexible display unit.

The distance from the rear surface of the left side or the right side of the flexible display unit to each of the reference positions may vary depending on a degree of bending of the flexible display unit, and the sensing unit may include a linear position sensor to generate different electrical signals according to the distances to sense a degree of bending of the flexible display unit based on the distances from the flexible display unit to the reference positions.

The sensing unit may include an optical sensor to measure a distance from a left or right end portion of the rear surface of the flexible display unit to each of the reference positions using a laser or infrared ray.

When the controller receives a control command for changing a degree of bending of the flexible display unit, the controller may compare the target radius of curvature based on the control command and the current radius of curvature of the flexible display unit to determine an operation direction of the driving unit.

The sensing unit may include an accelerometer installed in a left or right end portion of the flexible display unit to measure acceleration when the flexible display unit is bending, and the controller may determine a degree of bending of the flexible display unit using the accelerometer measured by the accelerometer.

Further scope of applicability will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given hereinbelow and the accompanying drawings, which are given by illustration only, and thus do not limit the present invention, and wherein.

DETAILED DESCRIPTION OF THE EMBODIMENTS

The embodiments of the present invention will now be described with reference to the accompanying drawings In the specification, like numbers refer to like elements throughout although the embodiments may be different, and a description of the like elements in a first embodiment may be used for those of the different embodiments. In the following description, usage of suffixes such as 'module', 'part' or 'unit' used for referring to elements is given merely to facilitate explanation of the present disclosure, without having any significant meaning by itself.

An image display device according to the present disclosure may include both a device of recording and/or reproducing images and a device for recording and/or reproducing audio by receiving and outputting broadcasts. Hereinafter, a TV as an example of the image display device will be illustrated.

Figure 1:
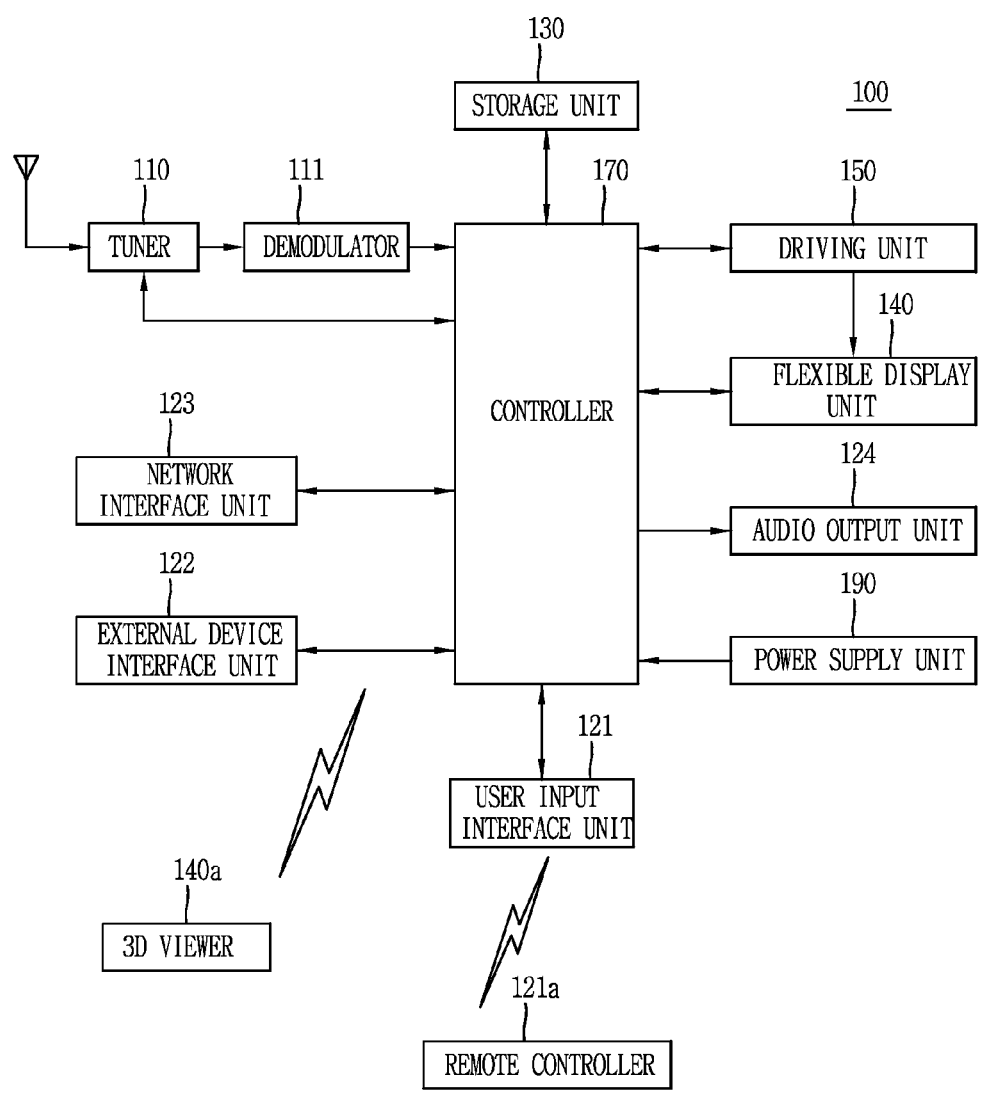
FIG. 1 is a block diagram of an image display device and a remote controller according to an exemplary embodiment of the present disclosure.

FIG. 1 is a block diagram of an image display device and a remote controller according to an exemplary embodiment of the present disclosure.

As illustrated in FIG. 1, the image display device 100 may include a tuner 110, a demodulator 111, an external device interface 122, a network interface 123, a storage unit 130, a user input interface 121, a controller 170, a flexible display unit 140, a driving unit 150, an audio output unit 124, a power supply unit 190 and a 3D viewer 140a.

The tuner 110 may select a radio frequency (RF) broadcast signal, which corresponds to a channel selected by a user, among RF broadcast signals received through an antenna, or every pre-stored channel. The tuner 110 may also convert the selected RF broadcast signal into a medium frequency signal or a baseband video or audio signal.

For example, when the RF broadcast signal selected is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video or audio signal (CVBS/SIF). That is, the analog baseband image or audio signal (CVBS/SIF) outputted from the tuner 110 may be inputted directly into the controller 170.

Also, the tuner 110 may receive a signal carrier RF broadcast signal according to an advanced television systems committee (ATSC) standard or a multi-carrier RF broadcast signal according to a digital video broadcasting (DVB) standard.

Meanwhile, the tuner 110 may sequentially select RF broadcast signals of all the broadcast channels stored through a channel memory function, of RF broadcast signals received via an antenna, and convert those RF broadcast signals into a medium frequency signal or a baseband video or audio signal.

The demodulator 111 may execute a decoding operation by receiving a digital IF signal (DIF) converted in the tuner 110.

For example, when the digital IF signal outputted from the tuner 110 is a signal according to the ATSC standard, the decoder 120 may perform 8-vestigal side band (8-VSB) demodulation. Here, the demodulator 111 may also perform trellis decoding, de-interleaving, reed Solomon decoding and the like. To this end, the decoder 120 may include a trellis decoder, de-interleaver, a reed Solomon decoder and the like.

As another example, when the digital IF signal (DIF) outputted from the tuner 110 is a signal according to the DVB standard, the demodulator 111 may perform a coded orthogonal frequency division modulation (COFDMA) demodulation. Here, the demodulator 111 may also perform convolution decoding, de-interleaving, reed Solomon decoding and the like. To this end, the demodulator 111 may include a convolution decoder, a de-interleaver, a reed Solomon decoder and the like.

The demodulator 111 may output a stream signal after decoding and channel decoding. Here, the stream signal may be a signal in which a video signal, an audio signal and a data signal are multiplexed. As one example, the stream signal may be an MPEG-2 transport stream (TS) signal obtained by multiplexing an MPEG-2 video signal and a Dolby AC-3 audio signal. In detail, an MPEG-2 TS signal may include a 4-byte header and a 184-byte payload.

The demodulator 111 may be provided separately according to the ATSC standard and the DVB standard. That is, an ATSC decoder and a DVB decoder may be provided.

The stream signal output from the demodulator 111 may be inputted into the controller 170. The controller 170 may perform demultiplexing, video/audio signal processing and the like, output video on the flexible display unit 140 and output audio to the audio output unit 124.

The external device interface 122 may connect an external device and the image display device 100 to each other. To this end, the external device interface 122 may include an A/V input/output unit (not shown) or a wireless communication unit (not shown).

The external device interface 122 may be connected, in a wired or wireless manner, to an external device, such as a digital versatile disk (DVD), a Bluray, a game machine, a camera, a camcorder, a laptop computer (notebook) and the like. The external device interface 122 may transfer a video, audio or data signal input from the exterior via the connected external device to the controller 170 of the image display device 100, and also output a video, audio or data signal processed in the controller 170 to the external device. For this, the external device interface 122 may include the A/V input/output unit or the wireless communication unit.

The A/V input/output unit may include a USB terminal, a composite video banking sync (CVBS) terminal, a component terminal, a S-video terminal (analog), a digital visual interface (DVI) terminal, a high definition multimedia interface (HDMI) terminal, an RGB terminal, a D-SUB terminal, and the like to allow video and audio signals of the external device to be inputted into the image display device 100.

The wireless communication unit may execute short-range wireless communication with other electronic devices. The image display device 100 may be connected to the other electronic device via a network according to communication standards, such as Bluetooth, radio frequency identification (RFID), infrared data association (IrDA), ultra wideband (UWB), Zigbee and the like.

The external device interface 122 may also be connected via at least one of various set-top boxes and the aforementioned various terminals, to execute input/output operations with the set-top boxes.

The external device interface 122 may execute data transmission and reception with the 3D viewer 140a.

The network interface 123 may provide an interface for connecting the image display device 100 to a wired or wireless network which includes an Internet network. The network interface 123 may include an Ethernet terminal for connection to the wired network, and use communication standards, such as wireless LAN (WLAN) (Wi-Fi), wireless broadband (Wibro), world interoperability for microwave access (Wimax), high speed downlink packet access (HSDPA) and the like for connection to the wireless network.

The network interface 123 may receive contents or data provided by a contents provider or a network operator via a network. That is, the network interface 123 may receive contents, such as a movie, an advertisement, a game, a VOD, a broadcast signal provided by the network operator, and related information via a network. The network interface 123 may also receive update information related to firmware and update files provided by the network operator. Also, the network interface 123 may transmit data to the contents provider or the network operator.

The network interface 123 may be connected to, for example, an Internet protocol (IP) TV, so as to receive a video, audio or data signal processed in an IPTV set-top box and transfer it to the controller 170 for allowing bi-directional communication. The network interface 123 may also transfer signals processed in the controller 170 to the IPTV set-top box.

The IPTV may indicate ADSL-TV, VDSL-TV, FTTH-TV or the like or indicate TV over DSL, Video over DSL, TV over IP (TVIP), Broadband TV (BTV) or the like, according to a type of transmission network. Also, the IPTV may indicate an Internet-accessible Internet TV, and a full-browsing TV.

The storage unit 130 may store programs for signal processing and control by the controller 170, and also store processed video, audio or data signals.

The storage unit 130 may execute a function of temporarily storing a video, audio or data signal input via the external device interface 122. Also, the storage unit 130 may store information related to a predetermined broadcast channel through a channel memory function of a channel map and the like.

The storage unit 130 may include at least one storage medium of a flash memory-type storage medium, a hard disc-type storage medium, a multimedia card micro-type storage medium, a card-type memory (for example, SD or XD memory), a random access memory (RAM), a read-only memory (ROM) (e.g., electrically erasable programmable ROM (EEPROM)), and the like. The image display device 100 may reproduce a file (a video file, a still image file, a music file, a document file, etc.) stored in the storage unit 130 to provide to a user.

FIG. 1 illustrates an exemplary embodiment having the storage unit 130, separate from the controller 170. However, the storage unit 140 may alternatively be configured to be included in the controller 170.

The user input interface 121 may transfer a user-input signal to the controller 170, or a signal from the controller 170 to the user.

For example, the user input interface 121 may receive a user input signal, such as a power on/off, a channel selection, a screen setting and the like from the remote controller 121*a*, or transmit a signal from the controller to the remote controller 121*a*, according to various communication standards, such as RF communication, IR communication and the like.

The user input interface 121, for example, may also transfer a user input signal, which is inputted from a local key (not shown), such as a power key, a channel key, a volume key, or a setting key, to the controller 170, for example.

Also, for example, the user input interface 121 may transfer a user input signal, which is inputted from a sensing unit (not shown) for sensing a user's gesture, to the controller 170 or transmit a signal from the controller 170 to the sensing unit (not shown). Here, the sensing unit may include a touch sensor, a voice sensor, a position sensor, a motion sensor and the like.

The controller 170 may demultiplex stream, which is inputted via the tuner 110, the demodulator 111 or the external device interface 122 or process the demultiplexed signals, to generate and output signals for outputting video or audio.

The video signal processed in the controller 170 may be inputted to the flexible display unit 140 to be outputted as an image corresponding to the image signal. Also, the video signal processed in the controller 170 may be inputted to an external output device through the external device interface 122.

The audio signal processed in the controller 170 may be outputted to the audio output unit 124. The audio signal processed in the controller 170 may be inputted to an external output device through the external device interface 122. Although not shown in FIG. 1, the controller 170 may include a demultiplexer, an image processor and the like.

Besides, the controller 170 may control an overall operation of the image display device 100. For example, the controller 170 may control the tuner 110 to select an RF broadcast corresponding to a user-selected channel or a pre-stored channel.

The controller 170 may also control the image display device 100 by a user command inputted via the user input interface 121 or an internal program.

For example, the controller 170 may control the tuner 110 to input a signal of a channel, which is selected in response to a predetermined channel select command received via the user input interface 121. The controller 170 may then process a video, audio or data signal of the selected channel. The controller 170 may control information related to the user-selected channel to be outputted through the flexible display unit 140 or the audio output unit 124 together with the processed video or audio signal.

As another example, the controller 170 may control a video signal or an audio signal, which is inputted from an external device, for example, a camera or a camcorder through the external device interface 122 in response to an external device image reproduce command received through the user input interface 121, to be outputted through the flexible display unit 140 or the audio output unit 124.

In the meantime, the controller 170 may control the flexible display unit 140 to display an image. For example, the controller 170 may control the flexible display unit 140 to output a broadcast image inputted through the tuner 110, an externally input image inputted through the external device interface 122, an image inputted through the network interface 123, or an image stored in the storage unit 130.

Here, the image output on the flexible display unit 140 may be a still image or a video, and a 2D or 3D image.

The controller 170 may allow a predetermined object within the image displayed on the flexible display unit 140 to be generated and displayed as a 3D object. For example, the object may be at least one of an accessed web screen (a newspaper, a journal, etc.), an electronic program guide (EPG), various menus, a widget, an icon, a still image, a video, and text.

The 3D object may be processed to have a different depth from the image displayed on the flexible display unit 140. Preferably, the 3D object may be processed to seem to protrude more than the image displayed on the flexible display unit 140.

In the meantime, the controller 170 may recognize a user's location based on an image captured by a capturing element (not shown). For example, the controller 170 may recognize a distance (z-axial coordinates) between the user and the image display device 100. Also, the controller 170 may recognize x-axial coordinates and y-axial coordinates within the image display device 100 corresponding to the user's location.

Although not shown, the image display device 100 may further include a channel browsing processor, which generates a thumbnail image corresponding to a channel signal or an externally input signal. The channel browsing processor may receive a stream signal outputted from the demodulator 111 or a stream signal outputted from the external device interface 122, extract an image from the input stream signal, and generate a thumbnail image. The generated thumbnail image may be inputted to the controller 170 as it is or after being encoded. Also, the generated thumbnail image may be inputted to the controller 170 after being encoded into a stream format. The controller 170 may output on the flexible display unit 140 a thumbnail list including a plurality of thumbnail images using the input thumbnail image. The thumbnail list may be displayed in a briefly viewing manner in which the list is displayed on a partial region with displaying a predetermined image on the flexible display unit 140, or in a fully viewing manner in which the list is displayed on most regions of the flexible display unit 140.

The flexible display unit 140 may generate a driving signal by converting an image signal, a data signal, an OSD signal and a control signal processed in the controller 170, or an image signal, a data signal and a control signal received via the external device interface 122.

In the present disclosure, the flexible display unit 140 is transformable (variable) into a flat form or a curved form. When the flexible display unit 140 is transformed into the curved form like surrounding a user located in front thereof, the flexible display unit 140 may provide the user with intense quality of image and allow the user to feel more involved in an image displayed thereon. The flexible display unit 140 may be implemented by an organic light emitting diode (OLED) panel, for example. The flexible display unit 140 may be implemented by a flexible liquid crystal display (LCD) panel, for example.

The flexible display unit 140 may be configured to provide a 3D image to a user. To view the 3D image, the flexible display unit 140 may be classified into an additional displaying method and an independent displaying method.

The independent displaying method may be configured such that a 3D image can be implemented just by the flexible display unit 140 without a separate 3D viewer 140a, for example, 3D glasses or the like. Various technologies such as a lenticular technology, a parallax barrier technology and the like may be applied as the independent displaying method.

The additional displaying method may be configured to implement a 3D image by using the 3D viewer 140a in addition to the flexible display unit 140. As one example, various methods such as a head mount display (HMD) type, a glass type and the like may be applied. Also, the glass type may be divided into a passive glass type such as a polarized glass type and the like, and an active glass type such as a shutter glass type and the like. The HMD type may also be divided into a passive HMD type and an active HMD type.

The flexible display unit 140 may be implemented as a touch screen so as to be used as an input device as well as an output device.

The driving unit 150 may transform the flexible display unit 140 into a flat form or a curved form. The driving unit 150 may transmit an electric signal to the flexible display unit 140 such that the flexible display unit 140 can be transformed by itself, or the driving unit 150 applies a physical force to the flexible display unit 140 directly or indirectly to transform the flexible display unit 140.

The audio output unit 124 may output sound by receiving an audio signal processed in the controller 170, for example, a stereo signal, a 3.1 channel signal or a 5.1 channel signal. The audio output unit 124 may be implemented into various types of speakers.

Meanwhile, to sense a user's gesture, as aforementioned, the image display device 100 may further include a sensing unit (not shown) having at least one of a touch sensor, a voice sensor, a location sensor, and a motion sensor. A signal sensed by the sensing unit may be transferred to the controller 170 via the user input interface 121.

The controller 170 may sense a user's gesture based on an image captured by the capturing element (not shown), a signal sensed by the sensing unit (not shown) or a combination thereof.

The power supply unit 190 may supply power to every component of the image display device 100. Especially, the power supply unit 190 may supply power to the controller 170 which may be implemented in a form of a system on chip (SOC), the flexible display unit 140 to display an image, and the audio output unit 124 to output audio. Also, depending on embodiments, power may be supplied to a heat generator including a hot wire.

The remote controller 121a may transmit a user input to the user input interface 121. To this end, the remote controller 121a may use various communication standards, such as IR communication, RF communication, Bluetooth, ultra wideband (UWB), Zigbee and the like. Also, the remote controller 121a may receive a video, audio or data signal output from the user input interface 121, so as to display the signal on the remote controller 121a or output the signal on the remote controller 121a in a form of sound.

The image display device 100 may be a fixed digital broadcast receiver capable of receiving at least one of ATSC (8-VSB) broadcast programs, DVB-T (COFDM) broadcast programs, and ISDB-T (BST-OFDM) broadcast programs or a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display device 100 may be an IPTV digital broadcast receiver capable of receiving cable broadcast programs, satellite broadcast programs or IPTV programs.

The image display device disclosed herein may include a TV receiver, a cellular phone, a smart phone, a notebook computer, a digital broadcasting terminal, a personal digital assistant (PDA), a portable multimedia player (PMP) and the like.

The block diagram of the image display device illustrated in FIG. 1 is a block diagram of one exemplary embodiment. Each component of the block diagram may be combined, added or omitted according to the configuration of the image display device 100. That is, if necessary, two or more components may be combined into one component, or one component may be divided into two components. Also, a function performed in each block is merely illustrative, and a detailed operation or device should not limit the scope of the present invention.

Figure 2:
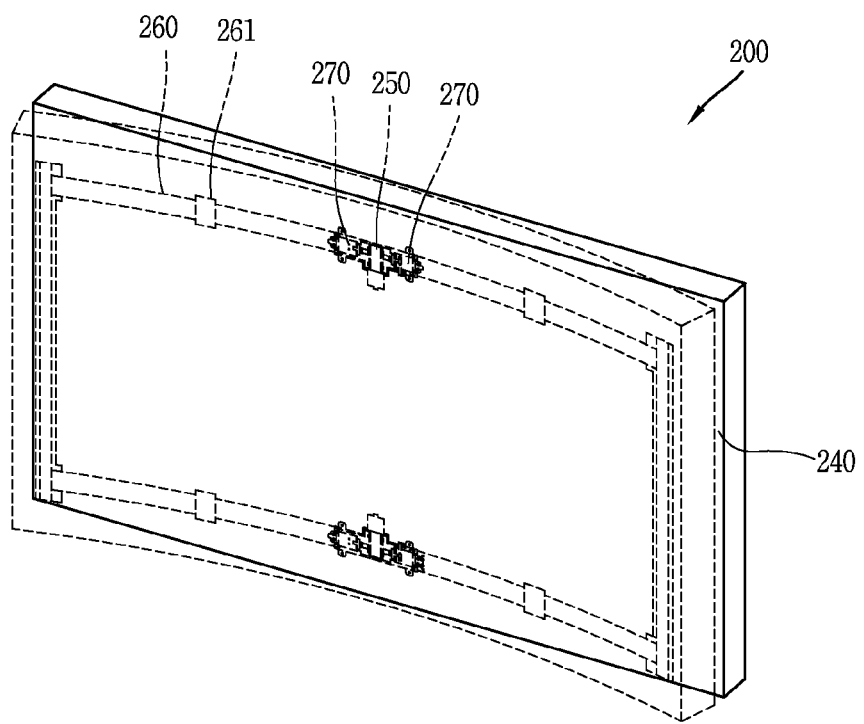
FIG. 2 is a perspective view illustrating states of a flexible display unit of an image display device before or after deformation according to an exemplary embodiment of the present disclosure.

FIG. 2 is a perspective view illustrating states of a flexible display unit 240 of an image display device 200 before or after deformation according to an exemplary embodiment of the present disclosure.

Referring to FIG. 2, the image display device 200 includes a flexible display unit 240, a pressing member 260, a driving unit 250, and adjusting units 270.

The flexible display unit 240 is formed to be deformable by external force between at least a first state and a second state each having a different degree of bending. For example, a flat state of the flexible display unit 240 may be understood as being a first state, and a bent state of the flexible display unit 240 may be understood as being a second state. The first state and the second state may be understood as being the contrary to the above. For example, in an exemplary embodiment of the present disclosure, the first state and the second state may be different, rather than being uniformly fixed. The first and second state may be randomly determined.

In the first state and the second state, the flexible display unit 240 may have different radii of curvature. As the flexible display unit 240 has a greater radius of curvature, the flexible display unit 240 is more flat. Conversely, as the flexible display unit 240 has a smaller radius of curvature, the flexible display unit 240 is more bent.

When the flexible display unit 240 is bowed toward the user (or viewer), the image display device may provide realistic image quality, a sense of immediacy, or a sense of immersion. When external force applied to the bent flexible display unit 240 is removed or when another external force is applied to the bent flexible display unit 240, the flexible display unit 240 may be restored to be flat.

The pressing member 260 is disposed on a rear surface of the flexible display unit 240 and applies external force to the flexible display unit 240. The pressing member 260 may be a plate in the form of a bar extending leftward and rightward from the flexible display unit 240 with respect to the driving unit 250. The pressing member 260 may have a shape other than the shape illustrated in FIG. 2.

One end portion of the pressing member 260 may be coupled to a left or right end portion of the flexible display unit 240, and the other end portion may be coupled to a respective adjusting unit 270. Since the adjusting units 270 protrude from a rear surface of the flexible display unit 240, even when the flexible display unit 240 is placed flat, the pressing member 260 may be bent toward the front surface of the flexible display unit 240 to a degree.

In order to implement stable bending of the flexible display unit 240, a plurality of pressing members 260 may be provided. For example, a plurality of pressing members 260 may be disposed at upper and lower portions of the flexible display unit 240, respectively.

A deformation limiting unit 261 is disposed between an end portion of the pressing member 260 and the adjusting units 270. The deformation limiting unit 261 is coupled to the flexibly display unit 240, holding the pressing member 260. The deformation limiting unit 261 prevents the pressing member 260 from parting away from the rear surface of the flexible display unit 240 when the pressing member 260 is bent.

When the adjusting units 270 move in a direction away from the driving unit 250, respectively, at least a portion of the pressing member 260 is bent to apply external force to the rear surface of the flexible display unit 240. Without the deformation limiting unit 261, the pressing member 260 may part away from the rear surface of the flexible display unit 240, without substantially applying external force to the flexible display unit 240. In order to prevent this phenomenon, the deformation limiting unit 261 may limit deformation of the pressing member 260 by holding the pressing member 260 to the rear surface of the flexible display unit 240.

The driving unit 250 may push on or pull on the pressing member 260 to implement bending of the flexible display unit 240. The pressing member 260 may be pushed on to be bent or pulled on to be restored, allowing the flexible display unit 240 to be deformed between the first state and the second state. The driving unit 250 may directly push on or pull on the pressing member 260. Also, the driving unit 250 may push on or pull on the adjusting units 270. Accordingly, the pressing member 260 coupled to the adjusting units 270 may be pushed on from or pulled on toward the driving unit 250.

In detail, when the driving unit 250 pushes on the pressing member 260, the pressing member 260 may be bent further than previously. As a result, the pressing member 260 may move away from the driving unit 250 to press against the left or right side of the flexible display unit 240. Accordingly, the flexible display unit 240 may be bent in a curved form.

Conversely, when the driving unit 250 pulls on the pressing member 260, the pressing member 260 may be restored to a state that is less bent than previously (namely, to a state in which the pressing member 260 is flat, relative to a previous state). During this process, the flexible display unit 240 which has been bent may be pulled on according to the restoration of the pressing member 260 and restored to be flat.

The adjusting units 270 are connected to the pressing member 260 and the driving unit 250 to transmit driving force from the driving unit 250 to the pressing member 260. The adjusting units 270 are formed to be movable in a direction away from the driving unit 250 or in a direction toward the driving unit 250 according to driving force from the driving unit 250. When the adjusting units 270 move away from the driving unit 250, the pressing member 260 connected to the adjusting units 270 may be pushed on in a left and right direction so as to be bent further than previously, and conversely, when the adjusting units 270 move closer to the driving unit 250, the pressing member 260 connected to the adjusting units 270 may be pulled on to be restored.

The adjusting units 270 may be moved according to driving of the driving unit 250 or may be rotatably manipulated. A movement of the adjusting units 270 according to driving of the driving unit 250 implements bending of the flexible display unit 240 and a movement of the adjusting units 270 based on rotation may implement fine correction with respect to a degree of bending of the flexible display unit 240. The adjusting units 270 will be described in detail hereinbelow.

Figure 3:
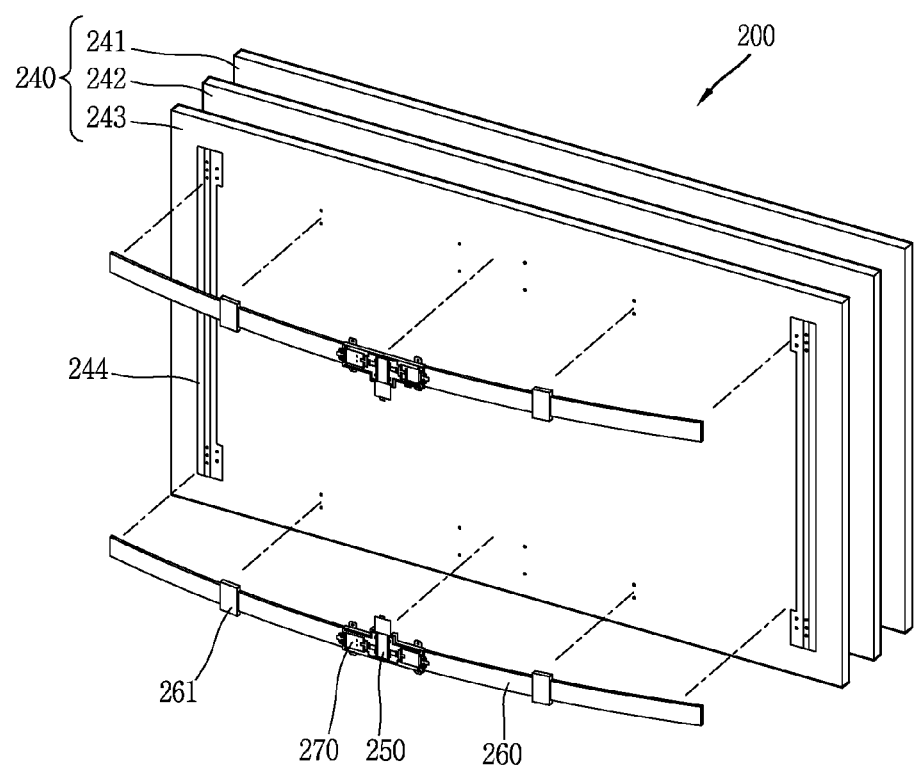
FIG. 3 is an exploded perspective view of the image display device illustrated in FIG. 2.

FIG. 3 is an exploded perspective view of the image display device illustrated in FIG. 2.

The flexible display unit 240 may be formed to be bendable and may be implemented in various manners. For example, the flexible display unit 240 may be implemented such that a display panel and a display cover thereof are simultaneously bent. In another example, the flexible display unit 240 may be implemented such that only a display panel is bent separately from a display cover. These schemes will be described hereinafter.

Referring to FIG. 3, the display panel may include an organic light emitting diode (OLED) panel 241. The OLED panel 241 is coupled to a display cover 243 by a bonding unit 242. The display cover 243 is disposed on a rear surface of the OLED panel 241, and the bonding unit 242 may be disposed between the OLED panel 241 and the display cover 243. The OLED panel 241 and the display cover 243 may be formed to have a substantially same shape, but the present disclosure is not limited thereto. The flexible display unit 240 illustrated in FIG. 3 is based on a scheme in which the OLED panel 241 and the display cover 243 are simultaneously bent.

Unlike the case of FIG. 3, a display panel may include a liquid crystal display (LCD) panel. Unlike the OLED panel 241, the LCD panel is not self-luminous, requiring a backlight unit. As the backlight unit, a light emitting diode (LED) may be used. The flexible display unit 240 in this case is based on a scheme in which only the display panel is bent separately from the fixed display cover.

A technical concept to be implemented by the present disclosure may be applied to any type of flexible display unit 240, as well as to the two implementation schemes described above. Hereinafter, for the purposes of description, the configuration in which the display panel and the display cover 243 are simultaneously bent will be described.

The driving unit 250 is installed on a rear surface of the display cover 243. The adjusting units 270 are installed on both sides of the pressing member 260. The pressing member 260 extends from the respective adjusting units 270 and an end portion of each of the pressing members 260 is coupled to the rear surface of the display cover 243.

A process of bending the flexible display unit 240 will be described. The adjusting units 270 move away from the driving unit 250 according to driving force generated by the driving unit 250. The pressing member 260 connected to the adjusting units 270 also moves away from the driving unit 250 and end portions of the pressing member 260 press on both sides of the display cover 243. Both sides of the display cover 243 become bent, and the OLED panel coupled to the display cover 243 by the bonding unit 242 is also bent together with the display cover 243. A process of restoring the flexible display unit 240 to a prior to bent state is performed in reverse to the process of bending the flexible display unit 240.

The pressing member 260 may be directly coupled to the display cover 243, or as illustrated in FIG. 3, a side bar 244 may be installed between the pressing member 260 and the display cover 243. The side bar 244 may extend in a longitudinal direction (corresponding to a vertical height of the image display device 200) to prevent the flexible display unit 240 from being twisted, and be coupled to the display cover 243. The side bar 244 may be coupled to the rear surface of the display cover 243 and end portions of the pressing member 260 may be coupled to the side bar 244.

The side bars 244 may be installed in left and right portions of the flexible display unit 240. The left side bar 244 is coupled to a left end portion of the pressing member 260, and the right side bar 244 is coupled to a right end portion of the pressing member 260.

Hereinafter, an internal structure of the image display device 200 will be described.

Figure 4:
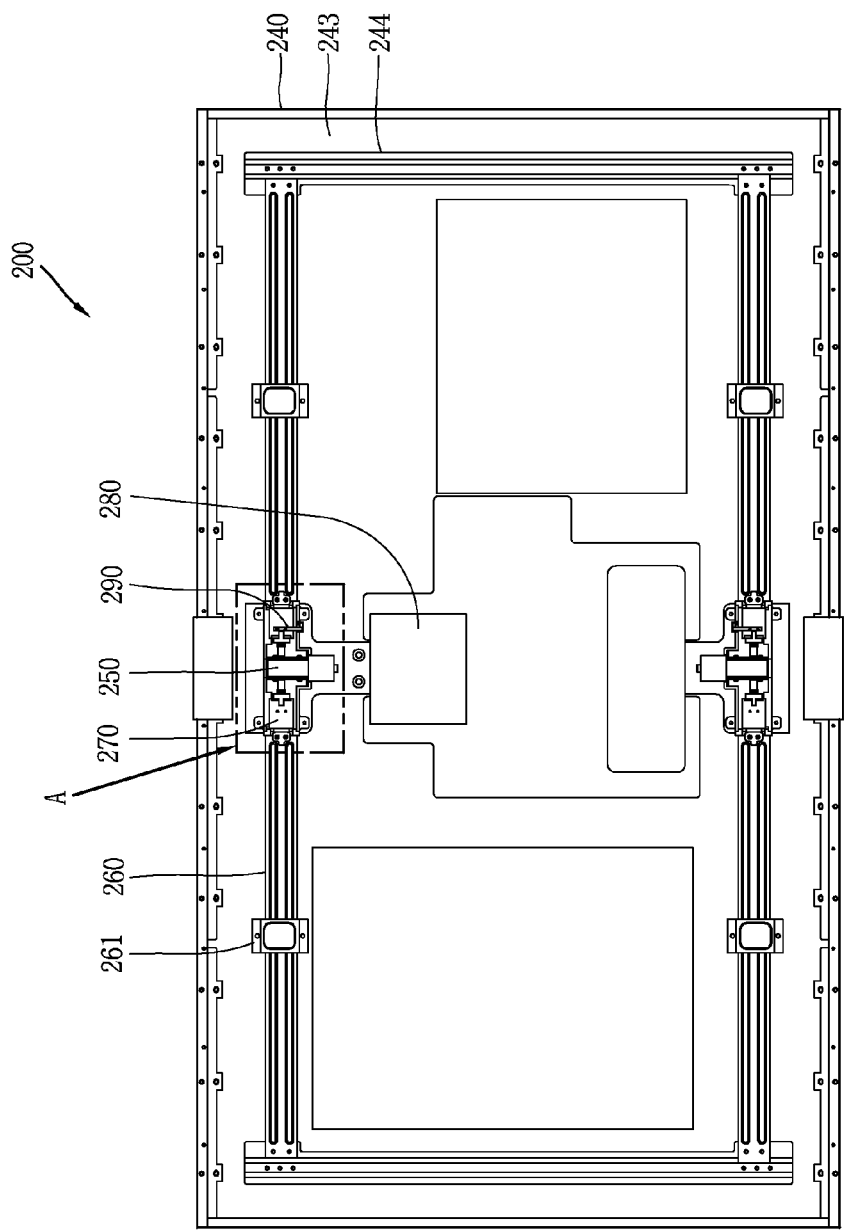
FIG. 4 is a rear view illustrating an internal structure of the image display device illustrated in FIG. 2.

FIG. 4 is a rear view illustrating an internal structure of the image display device 200.

The image display device 200 may include a rear cover (not shown), and FIG. 4 illustrates the image display device 200 without the rear cover. Without the rear cover, the display cover 243 of the image display device 200 is exposed. Also, the pressing member 260, the driving unit 250, and the adjusting units 270 are also exposed together with the display cover 243.

The driving unit 250 is installed on the display cover 243, and here, the driving unit 250 may be installed on the middle of the flexible display unit 240. Also, the driving units 250 may be installed on both upper and lower portions of the flexible display unit 240 to implement stable bending of the flexible display unit 240. The driving units 250 installed on upper and lower portions of the flexible display unit 240 may be symmetrical.

The adjusting units 270 may be disposed on left side and right side of each of the driving units 250. With respect to each of the driving units 250, the adjusting units 270 disposed on the left side of the driving unit 250 and the adjusting units 270 disposed on the right side of the driving unit 250 may be symmetrical. A structure connecting the driving units 250 and the adjusting units 270 will be described hereinbelow.

One end portions of the pressing members 260 are coupled to the adjusting units 270, and the other end portions of the adjusting units 270 are coupled to a side bar 244, respectively. In order to apply uniform external force to the rear surface of the flexible display unit 240, the pressing members 260 may be disposed to be symmetrical.

In order to implement stepwise bending of the image display device 200, a degree of bending of the flexible display unit 240 (namely, a degree to which the flexible display unit 240 is bent) should be taken into consideration. This is because, based on the degree of bending of the flexible display unit 240, whether to further deform or restore the flexible display unit 240 may be determined when a control command for changing the degree of bending of the flexible display unit 240 is applied.

The degree of bending of the flexible display unit 240 may be described with a radius of curvature. In a case in which a radius of curvature is relatively large, the flexible display unit 240 is close to a flat state. When the flexible display unit 240 is completely flat, a radius of curvature of the flexible display unit 240 is infinite. Conversely, when a radius of curvature of the flexible display unit 240 is smaller, the more the flexible display unit 240 is bent. It may be desirable for a radius of curvature of the flexible display unit 240 to be directly measured. However, directly measuring a radius of curvature of the flexible display unit 240 requires a very complicated additional structure, which is, thus, not desirable in terms of user preference or design.

In an exemplary embodiment of the present disclosure, in order to implement stepwise bending of the image display device 200, a sensing unit is provided. The sensing unit is configured to sense a degree of bending of the flexible display unit 240. In this case, the sensing unit measures a degree of bending of the flexible display unit 240 indirectly, rather than directly.

In order to further bend the flexible display unit 240, the driving unit 250 pushes on the adjusting units 270 and the pressing member 260 connected to the adjusting units 270 further presses the rear surface of the flexible display unit 240. Thus, a position of the adjusting nit 270 is varied according to a degree of bending of the flexible display unit 240. In detail, it is assumed that a first state of the flexible display unit 240 is a relatively bent state and a second state of the flexible display unit 240 is relative flat state. In this case, the adjusting units 270 in the first state exist at positions farther from the driving unit 250 than positions of the adjusting units 270 in the second state. Thus, positions of the adjusting units 270 may be used as references for determining a degree of bending of the flexible display unit 240.

Figure 5:
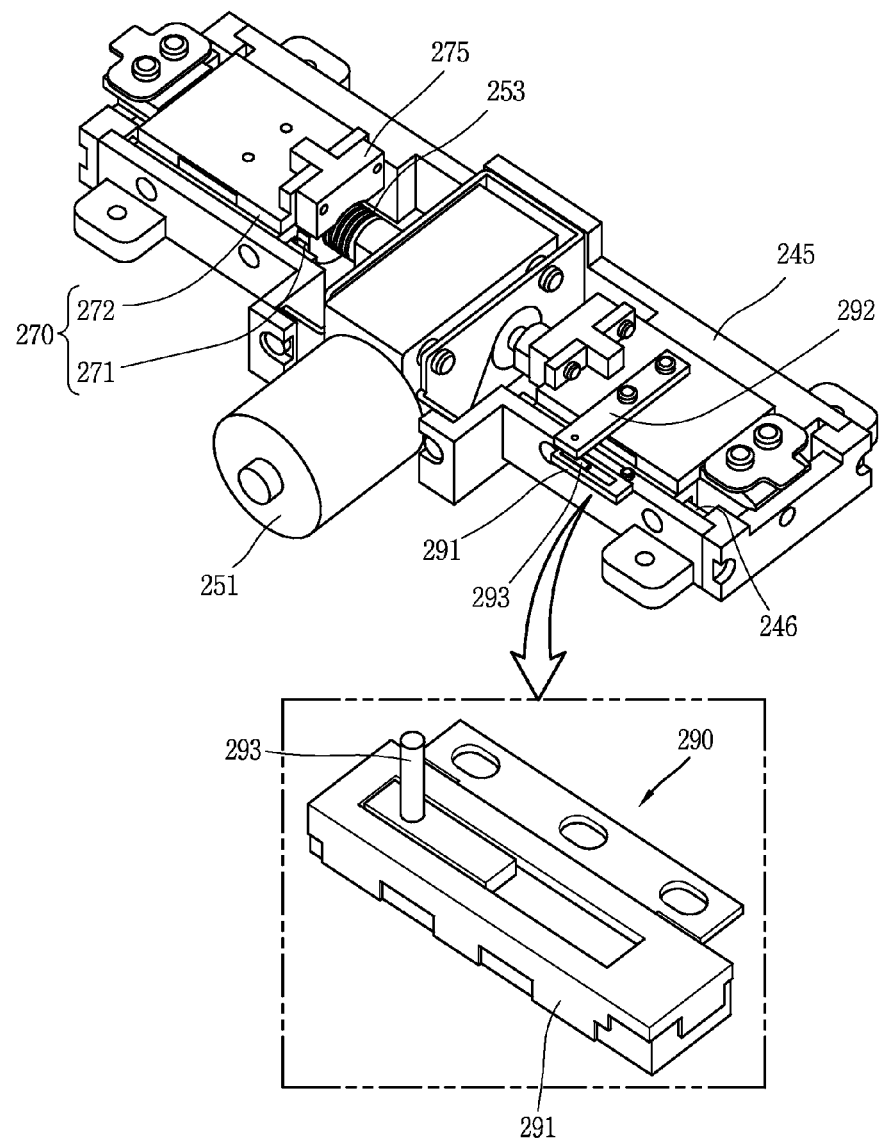
FIG. 5 is a perspective view illustrating an enlarged portion 'A' of FIG. 4.
Figure 6:
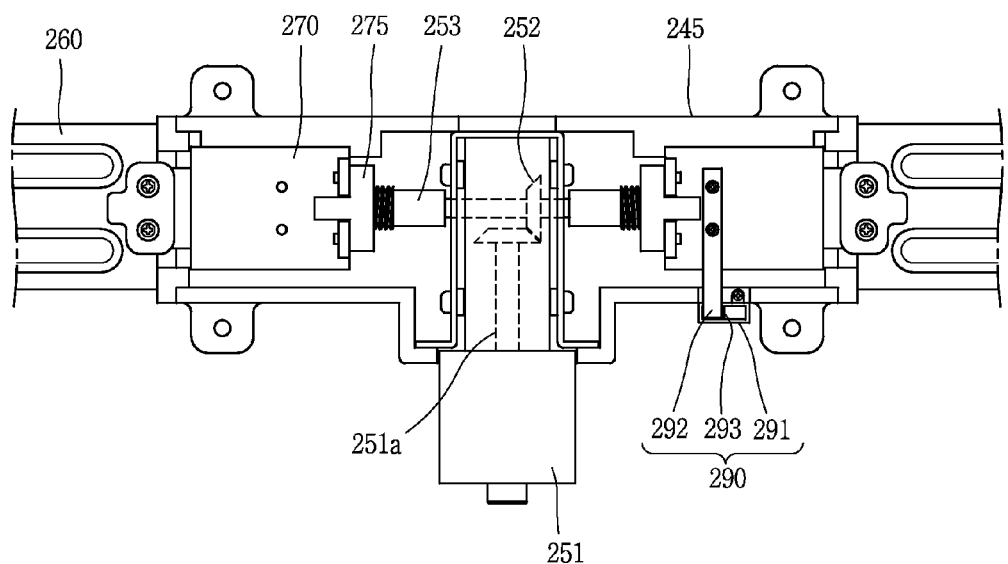
FIG. 6 is a conceptual view illustrating the portion 'A' of FIG. 4 viewed from the rear of the image display device.

The sensing unit includes a linear position sensor 290 generating different electrical signals according to positions of the adjusting units 270 to sense a degree of bending of the flexible display unit 240 based on the positions of the adjusting units 270. A detailed structure of the linear position sensor 290 and other components will be described in detail with reference to FIGS. 5 and 6. FIGS. 5 and 6 are enlarged view of a portion 'A' in FIG. 4. Specifically, FIG. 5 is a perspective view illustrating an enlarged portion 'A' of FIG. 4, and FIG. 6 is a conceptual view illustrating the portion 'A' of FIG. 4 viewed from the rear of the image display device.

A frame 245 is coupled to the rear surface of the flexible display unit 240. The driving unit 250 and the adjusting units 270 are installed within a region confined by the frame 245.

The driving unit 250 includes a driving motor 251, a bevel gear 252, and a lead screw 253.

The driving motor 251 is formed to generate rotary force along a driving shaft 251a. The driving shaft 251a is formed to be rotatable in a clockwise direction or in a counterclockwise direction according to a driving signal applied from the controller 280. The lead screw 253 indirectly connected to the driving shaft 251a as described hereinafter is also formed to be rotatable in both directions.

The bevel gear 252 is formed to change a central axis of the rotary force to a movement direction of the adjusting units 270. The bevel gear 252 may be engaged with a gear of the driving shaft 251a so as to be rotated, and a rotational direction of the bevel gear 252 is determined according to a rotational direction of the driving shaft 251a. The rotary force from the driving motor 251 may be transmitted to the lead screw 253 by the bevel gear 252.

A decelerator may be disposed between the driving shaft 251a and the bevel gear 252. The decelerator may be configured to amplify rotary power by sacrificing a rotational speed thereof.

The lead screw 253 is connected to the bevel gear 252 so as to be rotated by rotary force from the driving motor 251. The lead screw 253 may be connected to the bevel gear 252 directly or indirectly, and rotate together with the bevel gear 252. The lead screw 253 illustrated in FIG. 6 is directly connected to the bevel gear 252. When the driving motor 251 rotates, the bevel gear 252 rotatably in mesh with the driving shaft 251a of the driving motor 251 is also rotated. When the bevel gear 252 is rotated, the lead screw 253 connected to the bevel gear 252 is also rotated.

The lead screw 253 may be disposed in a direction substantially perpendicular to the driving shaft 251a. The lead screws 253 are provided on either side of the bevel gear 252, and each of the lead screws 253 is formed to be rotated together with the bevel gear 252. The lead screws 253 may be screw-coupled with the respective adjusting units 270 and move the adjusting units 270 in a direction away from the driving unit 250 or in a direction toward the driving unit 250 according to a rotational direction.

The lead screw 253 and the adjusting units 270 may be formed to be relatively movable with each other. A relative movement may be made by a rotation of the lead screw 253 or a rotation of the adjusting units 270. According to the relative movement of the lead screw 253 and the adjusting units 270, the pressing member 260 may move away from the driving unit 250 or move close to the driving unit 250. As a result, a degree of bending of the flexible display unit 240 may differ based on the movement of the pressing member 260.

Each of the adjusting units 270 includes a screw nut 271 and a moving body 272. A detailed structure of the adjusting units 270 will be described with reference to FIG. 7 hereinafter.

Figure 7:
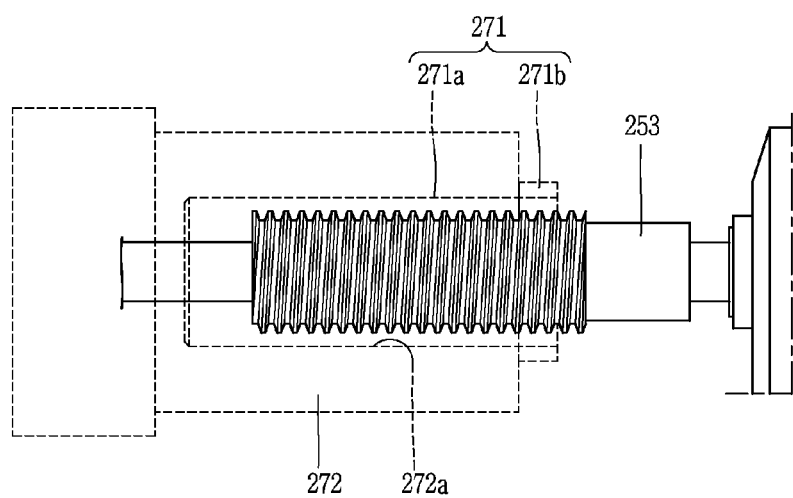
FIG. 7 is a conceptual view illustrating a structure of fastening a lead screw and a screw nut illustrated in FIG. 5.

FIG. 7 is a conceptual view illustrating a structure of fastening the lead screw 253 and the screw nut 271 illustrated in FIG. 5.

The screw nut 271 is screw-coupled to the lead screw 253 such that the screw nut 271 is rotatably rotated with respect to the lead screw 253. The screw nut 271 may be formed to have at least a portion having an annular shape to accommodate the lead screw 253, and has thread formed on an inner circumferential surface thereof. The lead screw 253 is inserted into the screw nut 271.

The moving body 272 is configured to accommodate the screw nut 271. The moving body 272 slidably moves in a direction away from the driving unit 250 or in a direction toward the driving unit 250 according to a relative rotation of the lead screw 253 and the screw nut 271. The moving body 272 slidably moves along a rear surface of the flexible display unit 240.

The moving body 272 has an open accommodation portion 272a at one side thereof facing the lead screw 253. The screw nut 271 includes a coupling portion 271a inserted into the accommodation portion 272a and an manipulation portion 271b exposed outwardly from the moving body 272.

The coupling portion 271a is disposed within the accommodation portion 272a of the moving body 272. The coupling portion 271a may have a helical groove corresponding to a thread of the lead screw 253.

The manipulation portion 271b is exposed to outside of the moving body 272 and located at one side of the moving body 272. The manipulation portion 271b is formed to be rotatably manipulated so as to be relatively moved with respect to the lead screw 253. The manipulation portion 271b may have a plurality of teeth protruding in the same pattern with pre-set intervals therebetween on an outer circumference thereof. In one example, the manipulation portion 271b has a shape of a hexagonal nut.

A slidable movement of the adjusting units 270 may be implemented by a rotational operation of the i) driving unit 250 or ii) the manipulation portion 271b. This will be described hereinafter.

First, a movement of the adjusting units 270 implemented by the driving unit 250 will be described.

The moving body 272 is coupled to the pressing member 260. An end portion of the pressing member 260 is fixed to the rear surface of the flexible display unit 240, for example, at the end portion, and thus, when the moving body 272 moves away from the driving unit 250 according to a relative rotation of the lead screw 253 and the screw nut 271, the pressing member 260 applies external force to the flexible display unit 240. Accordingly, a degree of bending of the flexible display unit 240 is progressively increased and a radius of curvature of the flexible display unit 240 is progressively reduced with the relative rotation of the lead screw 253 and the screw nut 271.

Conversely, when the moving body 272 move closer to the driving unit 250 according to a relative rotation of the lead screw 253 and the screw nut 271, the magnitude of external force applied to the flexible display unit 240 by the pressing member 260 is reduced progressively with the relative rotation of the lead screw 253 and the screw nut 271. Accordingly, the flexible display unit 240 becomes flat and a radius of curvature of the flexible display unit 240 is increased.

Next, a movement of the operating unit implemented by a rotation of the manipulation portion 271b will be described.

According to a rotation of the manipulation portion 271b, the screw nut 271 may also relatively move with respect to the lead screw 253. Due to the relative movement of the screw nut 271, the pressing member 260 may be bent further than previously or may be in a flatter state compared to previously. A degree of bending of the flexible display unit 240 may be changed according to a degree of bending of the pressing member 260.

In detail, when the manipulation portion 271b is rotatably manipulated in one direction so that the screw nut 271 is moved in a direction away from the lead screw 253, the moving body 272 having one surface supported by the screw nut 271 is also moved in the same direction and the pressing member 260 coupled to the moving body 272 is pushed out to be bent further than previously.

Conversely, when the manipulation portion 271b is rotatably manipulated in the other direction so the screw nut 271 is moved in a direction toward the lead screw 253, the moving body 272 may be moved in the same direction by the pressing member 260 under force of restoration. As a result, the pressing member 260 is restored to be in a flatter state than previously.

The relative movement between the screw nut 271 and the lead screw 253 according to a rotational manipulation of the manipulation portion 271b may be used in finely correcting bending of the flexible display unit 240.

Meanwhile, based on a pitch between threads of the lead screw 253, a rotation angle of the screw nut 271, or the like, when a tooth is moved to a position previously held by an adjacent tooth, a relative movement distance between the screw nut 271 and the lead screw 253 may be obtained. Thus, when the manipulation portion 271b is rotatably manipulated as described above, more fine correction may be made.

Hereinafter, the other components will be described with reference to FIGS. 5 and 6.

The frame 245 may have a guide portion 246 that guides a slidable movement of the moving body 272. The guide portion 246 may be integrally formed with the frame 245 or may be configured as a separate member and coupled to the frame 245. The guide portion 246 may be formed in an extending direction of the moving body 272 to guide a slidable movement of the moving body 272.

The guide portion 246 may be formed in the form of a guide groove or a guide rail. For example, in a case in which a guide groove is formed in the moving body 272, the guide portion 246 may be formed as a guide rail corresponding with the guide groove. In another example, in a case in which a guide protrusion is formed in the moving body 272, the guide portion 246 may be formed as a guide groove corresponding with the guide protrusion.

The moving body 272 is slidably moved along a determined path by the guide portion 246, and the guide portion 246 may prevent the moving body 272 from being released from the moving path of the moving body 272 determined by the guide portion 246. Thus, the guide portion 246 may prevent the flexible display unit 240 from being abnormally bent.

The manipulation portion 271b may be protected by a cover. The cover 275 may be screw-fastened to the moving body 272. The cover 275 may cover at least a portion of the manipulation portion 271b to prevent the screw nut 271 from being released from the moving body 272. When fine manipulation using the manipulation portion 271b is required, the cover 275 may be separated from the moving body 272. After fine manipulation is completed, the cover 275 may be coupled back to the moving body 272.

The linear position sensor 290 includes a housing 291, a link 292, and a linear switch 293.

The housing 291 is installed on a rear surface of the flexible display unit 240. The housing 291 may be directly installed on the flexible display unit 240, or may be installed on the frame 245 as illustrated in FIG. 5. Since the frame 245 is installed on the flexible display unit 240, when the housing 291 is installed on the frame 245, the housing 291 may be installed on the rear surface of the flexible display unit 240.

The link 292 is coupled to the adjusting units 270 so as to be moved together with the adjusting units 270. In detail, the link 292 is coupled to the moving body 272, and when the moving body 272 is slidably moved, the link 292 may also be moved alongside the moving body 272.

One end of the linear switch 293 is coupled to the link 292. The other end of the linear switch 293 slidably moves within the housing 291 according to a movement of the link 292. Thus, when the adjusting units 270 slidably move, a position of the linear switch 293 within the housing 291 changes with the sliding movement of the adjusting units 270.

The linear position sensor 290 is configured to generate different electrical signals according to distances from a reference position to the linear switch 293. The electrical signals may be, for example, a voltage.

Stepwise bending of the flexible display unit 240 may be implemented using the linear position sensor 290. The process will be described with reference to FIGS. 6 and 8.

Figure 8:
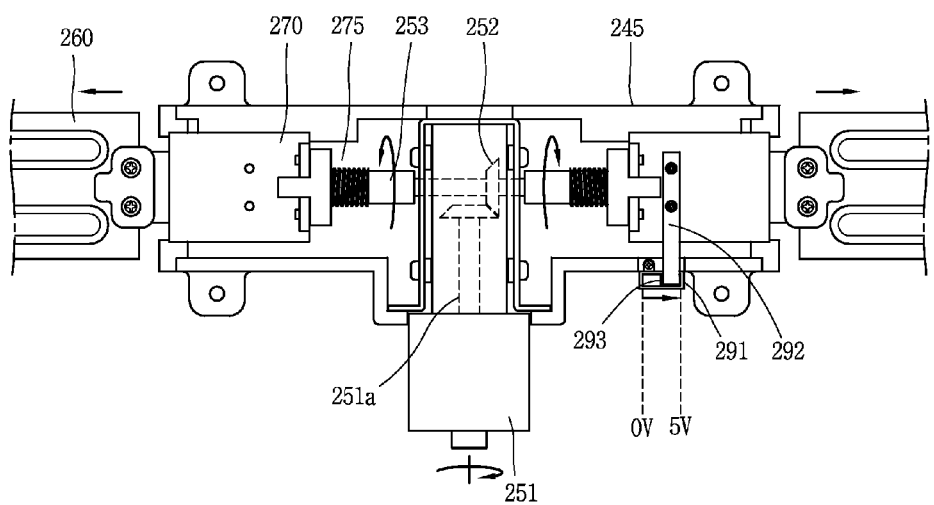
FIG. 8 is a conceptual view illustrating a process of implementing stepwise bending of the flexible display unit compared to FIG. 6.

FIGS. 6 and 8 are conceptual views illustrating a process of implementing stepwise bending of the flexible display unit 240.

In order to implement stepwise bending of the flexible display unit 240, a current radius of curvature needs to be checked. Thereafter, the flexible display unit 240 is bent up to a target radius of curvature from the current radius of curvature.

First, a process of checking a current radius of curvature of the flexible display unit 240 will be described.

The linear position sensor 290 generates a different electrical signal according to a distance from a reference position to the linear switch 293. For example, if the leftmost position within the housing 291 is a reference position, when the linear switch 293 is at the reference position, the linear position sensor 290 may generate a voltage of 0V. Referring to FIG. 6, it can be seen that the linear switch 293, though covered by the link 292, is positioned at the leftmost position of the housing 291.

Similarly, when the linear switch 293 is located at the rightmost position, the linear position sensor 290 may generate a voltage of 5V. Referring to FIG. 8, it can be seen that the linear switch 293, though covered by the link 292, is positioned at the rightmost position of the housing 291. Thus, the linear position sensor 290 generates 0V in the state shown in FIG. 6 and 5V in the state shown in FIG. 8. Here, 0V or 5V are given for the purposes of illustration and may be changed according to a setting. Thus, these values should not be used to limit the scope of the present invention.

Also, when the linear switch 293 is positioned between the leftmost position and the rightmost position of the housing 291, the linear position sensor 290 may generate a voltage between 0V and 5V based on the position of the linear switch 293. A voltage generated by the linear position sensor 290 may be a continuous value. As the linear switch 293 is closer to the reference position, a voltage generated by the linear position sensor 290 is closer to 0V, and as the linear switch 293 moves away from the reference position, a voltage generated by the linear position sensor 290 is closer to 5V.

A radius of curvature of the flexible display unit 240 corresponding to a voltage of the linear position sensor 290 may be set in advance. For example, in a state in which the flexible display unit 240 is flat, a radius of curvature of the flexible display unit 240 is infinite. The linear switch 293 may be set to be at the reference position in the state in which the flexible display unit 240 is flat. In this case, a voltage generated by the linear position sensor 290 is 0V. In another example, the linear switch 293 may be set to be at the rightmost position of the housing 291 when the flexible display unit 240 desired to be implemented in the image display device 200 has a minimum radius of curvature (in a state in which the flexible display unit 240 is maximally bent. In this case, the linear position sensor generates 5V.

A voltage generated by the linear position sensor 290 is determined according to a position of the linear switch 293, and a position of the linear switch 293 is determined according to a radius of curvature of the flexible display unit 240. Thus, when a voltage generated by the linear position sensor 290 is checked, information regarding a current radius of curvature of the flexible display unit 240 may be obtained.

The controller 280 determines a degree of bending of the flexible display unit 240 based on a voltage generated by the linear position sensor 290. When voltage generated by the linear position sensor 290 is 0V, it means that the linear switch 293 is at the reference position and the adjusting units 270 are positioned closest to the driving unit 250. In this case, the flexible display unit 240 is recognized as being flat. Similarly, in a case in which a voltage generated by the linear position sensor 290 is 5V, it means that the linear switch 293 is at a position farthest from the reference position and the adjusting units 270 is at a position farthest from the driving unit 250. In this case, the flexible display unit 240 is recognizes as being maximally bent.

The linear position sensor 290 generates a voltage between 0V and 5V according to a position of the linear switch 29, and the controller determines a degree of bending of the flexible display unit 240 based on the voltage between 0V and 5V. For example, in a case in which a voltage generated by the linear position sensor 290 is 3V, the controller 280 recognizes that the flexible display unit 240 is bent to have a radius of curvature of about a median value. In a case in which a voltage generated by the linear position sensor 290 is 2V, the controller 280 recognizes that the flexible display unit 240 is closer to a flat state. Conversely, in a case in which a voltage generated by the linear position sensor 290 is 4V, the controller 280 recognizes that the flexible display unit 240 is closer to a maximally bent state.

Hereinafter, a process of implementing the flexible display unit 240 to be bent from a current radius of curvature to reach a target radius of curvature will be described.

The controller 280 controls the driving unit 250 to move the adjusting units 270. Thus, when the controller 280 drives the driving unit 250, a degree of bending of the flexible display unit 240 may be changed by the pressing member 260 connected to the adjusting units 270.

The controller 280 may receive a control command for changing a degree of bending of the flexible display unit 240. The control command may be applied through the user input interface 121 (see FIG. 1) or the remote controller 121a (see FIG. 1). The controller 280 compares the target radius of curvature of the flexible display unit 240 based on the control command and the current radius of curvature sensed by the linear position sensor 290. The controller 280 determines a movement direction and a movement distance of the adjusting units 270 according to the comparison results obtained by comparing the target radius of curvature and the current radius of curvature.

When the target radius of curvature based on the control command is smaller than the current radius of curvature sensed by the linear position sensor 290, the controller 280 (see FIG. 4) controls the driving unit 250 to move the adjusting units 270 in a direction toward the driving unit 250. When the target radius of curvature is greater than the current radius of curvature, it means that a control command for instructing the flexible display unit 240 to become close to a flat state has been applied. As the adjusting units 270 are moved in a direction toward the driving unit 250, the pressing member 260 connected to the adjusting units 270 is pulled on in a direction toward the driving unit 250. As a result, a magnitude of external force exerted on the flexible display unit 240 is reduced and the flexible display unit 240 is closer to a flat state than before the control command was applied.

For example, if a current voltage generated by the linear position sensor 290 is 5V and a voltage corresponding to the target radius of curvature based on the control command is 3V. The controller 280 compares the target radius of curvature based on the control command and the current radius of curvature. Since the target radius of curvature is greater than the current radius of curvature, the controller 280 controls the driving unit 250 to move the adjusting units 270 in a direction toward the driving unit 250. In response to the movement of the adjusting units 270, the linear switch 293 is also moved, and a voltage generated by the linear position sensor 290 is progressively reduced. The controller 280 controls the driving unit 250 until a voltage generated by the sensor 290 reaches 3V.

Conversely, in a case in which the target radius of curvature based on the control command is greater than the current radius of curvature sensed by the linear position sensor 290, the controller 280 controls the driving unit 250 to move the adjusting units 270 in a direction away from the driving unit 250. When the target radius of curvature is smaller than the current radius of curvature, it means that a control command for bending the flexible display unit 240 to a curvature greater than at present curvature has been applied. As the adjusting units 270 is moved in a direction away from the driving unit 250, the pressing member 260 connected to the adjusting units 270 is pushed on in a direction away from the driving unit 250. As a result, a magnitude of external force exerted on the flexible display unit 240 is increased and the flexible display unit 240 is bent more than that before the control command was applied.

For example, if a current voltage generated by the linear position sensor 290 is 0V and a voltage corresponding to a target radius of curvature based on a control command is 3V. The controller 280 compares the target radius of curvature based on a control command and a current radius of curvature sensed by the linear position sensor 290. Since the target radius of curvature is smaller than the current radius of curvature, the controller 280 controls the driving unit 250 to move the adjusting units 270 in a direction away from the driving unit 250. In response to the movement of the adjusting units 270, the linear switch 293 is also moved and a voltage generated by the linear position sensor 290 is progressively increased. The controller 280 controls the driving unit 250 until when the voltage generated by the linear position sensor 290 reaches 3V.

The controller 280 is configured to continuously receive feedback of information regarding the radius of curvature of the flexible display unit 240 from the linear position sensor 290 from the current radius of curvature of the flexible display unit 240 until the target radius of curvature is reached. For example, if a voltage of the linear position sensor 290 corresponding to a current radius of curvature is 0V and a voltage of the linear position sensor 290 corresponding to a target radius of curvature is 3V. The controller 280 controls the driving unit 250 until a voltage generated by the linear position sensor 290 is changed from 0V to reach 3V. While the controller 280 controls the driving unit 250, the controller 280 continuously receives feedback of information regarding a radius of curvature from the linear position sensor 290 from the current radius of the curvature to the target radius of the curvature. The linear position sensor 290 may generate a voltage 0V, a voltage 3V, or a voltage between 0V and 3V, and the voltage may be provided to the controller 280. When a voltage provided from the linear position sensor 290 reaches 3V, the controller 280 stops controlling the driving unit 250. If a voltage provided from the linear position sensor 290 exceeds 3V, the controller 280 may control the driving unit 250 to rotate in the opposite direction.

Through these processes, accurate stepwise controlling of the flexible display unit 240 according to an exemplary embodiment of the present disclosure may be implemented. Bending of the flexible display unit 240 may be set to 50 levels or more and the number of levels may be increased or decreased according to a desired setting.

The flexible display unit 240 may be controlled in a consecutive manner. The controller 280 may operate the driving unit 250 based on a control command instructing start of an operation of the driving unit 250. As the driving unit 250 is operated, the flexible display unit 240 may be consecutively curved or may become nearly flat. The controller 280 may stop the driving unit 250 based on a control command instructing stop of the operation of the driving unit 250. Through such processes, the flexible display unit 240 may be transformed to have a user's desired curvature radius.

Hereinafter, an exemplary embodiment in which a degree of bending of a flexible display unit in a different manner from that of the exemplary embodiment described above will be described.

Figure 9:
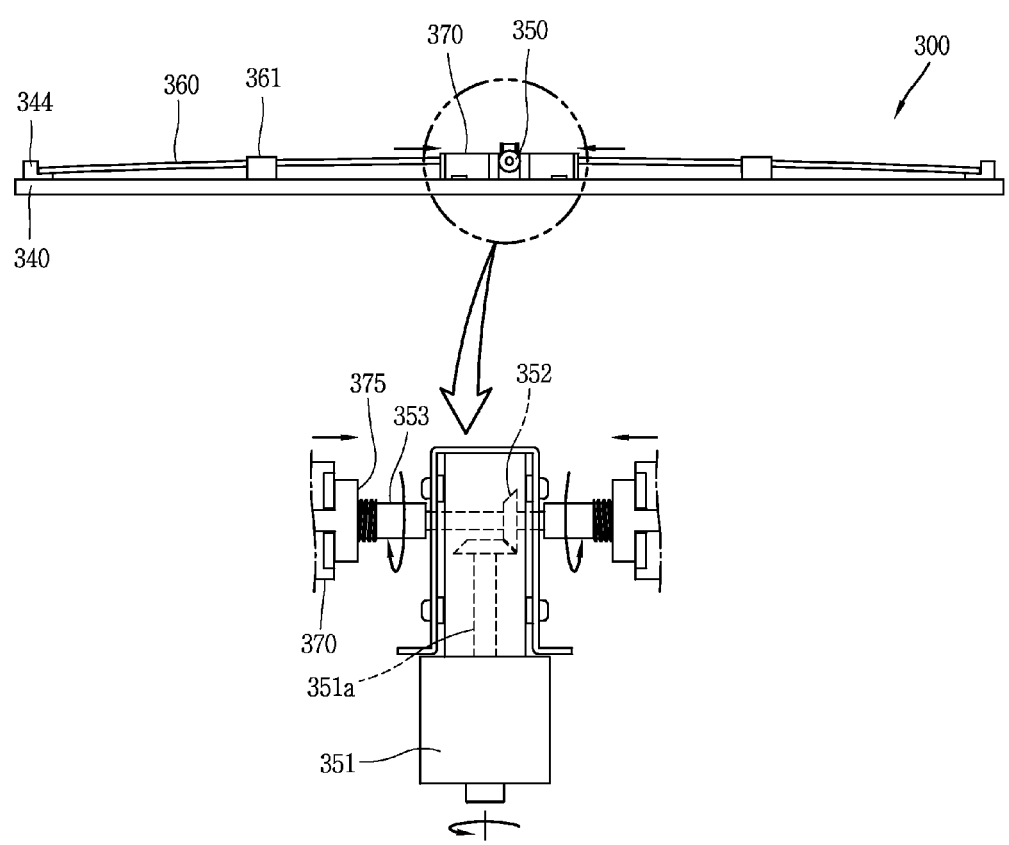
FIGS. 9 and 10 are conceptual views illustrating an image display device according to another exemplary embodiment of the present disclosure.
Figure 10:
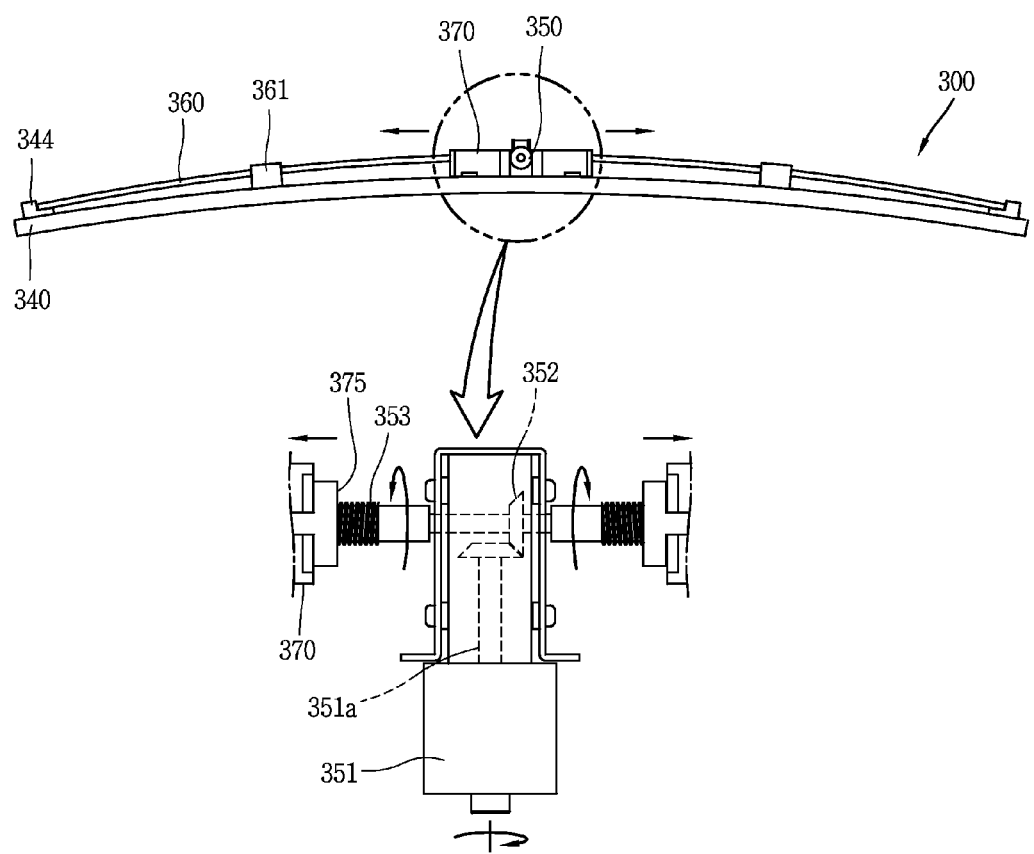

FIGS. 9 and 10 are conceptual views illustrating an image display device 300 according to another exemplary embodiment of the present disclosure.

In order to implement stepwise bending of a flexible display unit 340, a driving unit 350 pushes on or pulls on an adjusting units 370. When the driving unit 350 operates, a driving motor 351 and a lead screw 353 rotate in a clockwise direction or in a counterclockwise direction. Thus, rotation angles of the driving motor 351 and the lead screw 353 may vary depending on a degree of bending of the flexible display unit 340.

A sensing unit (not shown) may sense a degree of bending of the flexible display unit 340 based on at least one of the rotation angle (or the number of rotations, and the same as it is hereinafter) of the driving motor 351 and the rotation angle of the lead screw 353. In this case, the sensing unit may be installed as a separate member or may simply be implemented to calculate the number of rotations of the driving motor 351 or the lead screw 353. For example, it is assumed that positions of the driving motor 351 and the lead screw 353 when the flexible display unit 340 is flat are reference positions thereof. A degree of bending of the flexible display unit 340 may be determined by how far the driving motor 351 or the lead screw 353 has rotated from the reference position. Thus, when a rotation angle of the driving motor 351 or a rotation angle of the lead screw 353 is measured, a degree of bending of the flexible display unit 340 may be determined.

The sensing unit is configured to sense a rotation angle of the driving motor 351 or a rotation angle of the lead screw 353. The controller 280 (see FIG. 4) determines a current radius of curvature of the flexible display unit 340 based on the rotation angle of the driving motor 351 or the rotation angle of the lead screw 353 provided from the sensing unit.

When a control command for implementing stepwise bending of the flexible display unit 340 is received, the controller 280 controls the driving unit 350 based on the rotation angle sensed by the sensing unit in the same manner as that described above.

When a control command for bending the flexible display unit 340 is applied, the controller receives information regarding a current radius of curvature from the sensing unit. The sensing unit senses a rotation angle of the driving motor 351 with respect to the reference position corresponding to the driving motor 351 and a rotation angle of the lead screw 353 with respect to the reference position corresponding to the lead screw 353. The controller 280 compares the target radius of curvature based on the control command and the current radius of curvature sensed by the sensing unit.

When the target radius of curvature is smaller than the current radius of curvature, the controller controls the driving unit 350 to move the adjusting units 370 in a direction toward the driving unit 350 as illustrated in FIG. 9. During this process, the controller 280 continuously receives feedback of information regarding a radius of curvature from the sensing unit. And, the controller controls the driving unit 350 until a rotation angle of the driving motor 351 or a rotation angle of the lead screw reaches a rotation angle corresponding to the target radius of curvature.

When the target radius of curvature is greater than the current radius of curvature, the controller controls the driving unit 350 to move the adjusting units 370 in a direction away from the driving unit 350 as illustrated in FIG. 10. During this process, the controller 280 continuously receives feedback of information regarding a radius of curvature from the sensing unit. And, the controller controls the driving unit 350 until a rotation angle of the driving motor 351 or a rotation angle of the lead screw reaches a rotation angle corresponding to the target radius of curvature.

A principle of implementing a stepwise bending of the flexible display unit 340 of the exemplary embodiment illustrated in FIGS. 9 and 10 is identical to the exemplary embodiment as described above, except for an operation principle of the sensing unit.

The exemplary embodiments described above provide structures implementing stepwise bending of the flexible display unit. Since the linear position sensor described above measures a radius of curvature, while moving along the rear surface of the flexible display unit, any other complicated components are not required, and thus, a thickness of the image display device is not significantly increased by the foregoing structure.

Hereinafter, other exemplary embodiments of the present disclosure will be described. In the following exemplary embodiments, a driving unit and a pressing member may be disposed in the left and right of a rear surface of a flexible display unit, rather than being disposed in the middle of the flexible display unit. Also, a sensing unit may also be disposed at a position adjacent to the driving unit and the pressing member. Accordingly, in the exemplary embodiments described hereinafter, a method of directly measuring from a reference position to a rear surface of the flexible display unit may be used.

Figure 11:
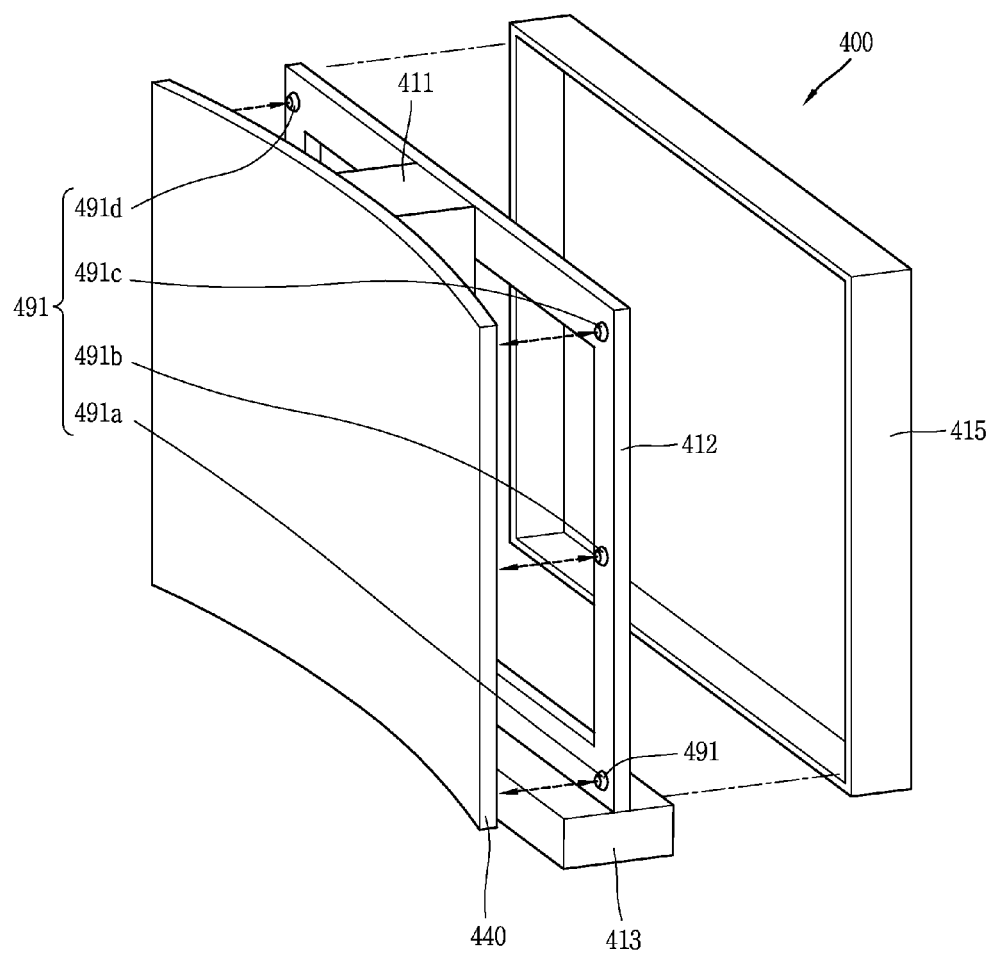
FIG. 11 is a conceptual view illustrating an image display device according to another exemplary embodiment of the present disclosure.

FIG. 11 is a conceptual view illustrating an image display device 400 according to another exemplary embodiment of the present disclosure.

An image display device 400 includes a rear cover 415 formed to cover a flexible display unit 440 and form at least a portion of a rear surface and a lateral surface of the image display device 400. Exposure of a structure implementing stepwise bending of the flexible display unit 440 to the outside is not desirable visually in terms of design. The rear cover 415 covering the flexible display unit 440 prevents the structure from being exposed to the outside. The structure implementing the flexible display unit 440 is disposed between the rear surface of the flexible display unit 440 and the rear cover 415.

When a sufficient space is secured between the rear surface of the flexible display unit 440 and the rear cover 415, a driving unit (not shown) and a sensing unit 491 based on a scheme different from those of the exemplary embodiments described above may be applied.

The sensing unit 491 may sense a degree to which the flexible display unit 440 is bent based on a distance from a reference position to a left rear surface of the flexible display unit 440 or a right rear surface of the flexible display unit 440. Here, the left rear surface of the flexible display unit 440 refers to a partial region of a left end portion of the rear surface of the flexible display unit 440. Similarly, the right rear surface of the flexible display unit 440 refers to a partial region of a right end portion of the rear surface of the flexible display unit 440.

A reference position of distance measurement is set in a region formed between the rear surface of the flexible display unit 440 and the rear cover 415. The sensing unit 491 may include optical sensors 491a, 491b, 491c 491d that measures a distance from a left rear surface or right rear surface of the flexible display unit 440 to each of the reference positions using a laser or infrared ray.

As illustrated in FIG. 11, the image display device 400 may include a support 411, a frame 412, and a lower prop 413.

The support 411 may extend in a vertical direction (corresponding to a vertical height of the image display device 400) and be coupled to a rear surface of the flexible display unit 440. The support 411 may be coupled to a middle portion of the flexible display unit 440, and in this case, components such as a driving unit, a pressing member, or the like, for implementing stepwise bending of the flexible display unit 440 may be disposed on both sides spaced apart from the support 411. This will be described with reference to FIG. 13.

The frame 412 is disposed between the rear surface of the flexible display unit 440 and the rear cover 415 and forms a reference position from which a distance is measured by the sensing unit 491. As illustrated in FIG. 11, the sensing units 491 may be disposed on both sides of the frame 412 and directly measure a distance between the rear surface of the flexible display unit 440 and the reference position.

The lower prop 413 is disposed under the frame 412 to support the frame 412. The lower prop 413 may be a selective component.

When the flexible display unit 440 is in a flat state, a distance from the reference position measured by the sensing unit 491 to the rear surface of the flexible display unit 440 is smallest. As the flexible display unit 440 is increasingly bent, the distance from the reference position to the rear surface of the flexible display unit 440 is increased. Thus, when a distance from the rear surface of the flexible display unit 440 to the reference position is measured, a degree of bending of the flexible display unit 440 may be determined.

The controller 170 (see FIG. 1) may determine a current radius of curvature of the flexible display unit 440 based on distance information provided from the sensing unit 491. When the controller 170 receives a control command for changing bending of the flexible display unit 440, the controller 170 may compare the current radius of curvature and the target radius of curvature to determine an operation direction of the driving unit (not shown).

The sensing unit may include the linear position sensor as described above, in addition to the optical sensors 491a, 491b, 491c, 491d. A principle of the linear position sensor (not shown) is the same as that described above. A distance from the left or right rear surface of the flexible display unit 440 to the reference position varies depending on a degree of bending of the flexible display unit 440. Based on distances from the flexible display unit 440 to the reference position, the linear position sensor generates different electrical signals according to the distances to sense a degree of bending of the flexible display unit 440.

For example, if the linear position sensor 290 illustrated in FIG. 5 is applied to the image display device 400 of FIG. 11, the housing 291 is fixed to the frame 412 and the link 292 is connected to the left or right side of the flexible display unit 440. When the link 292 is moved together with the flexible display unit 440, the linear switch 293 is also moved along the link 292. The controller 170 determines a degree of bending of the flexible display unit 440 based on an electrical signal (for example, a voltage) generated according to a position of the linear switch 293. A disposition structure of the linear position sensor 290 may vary, and the linear position sensor 290 may have any structure as long as it can measure a distance between a left or right side of the flexible display unit 440 and the reference position.

Figure 12:
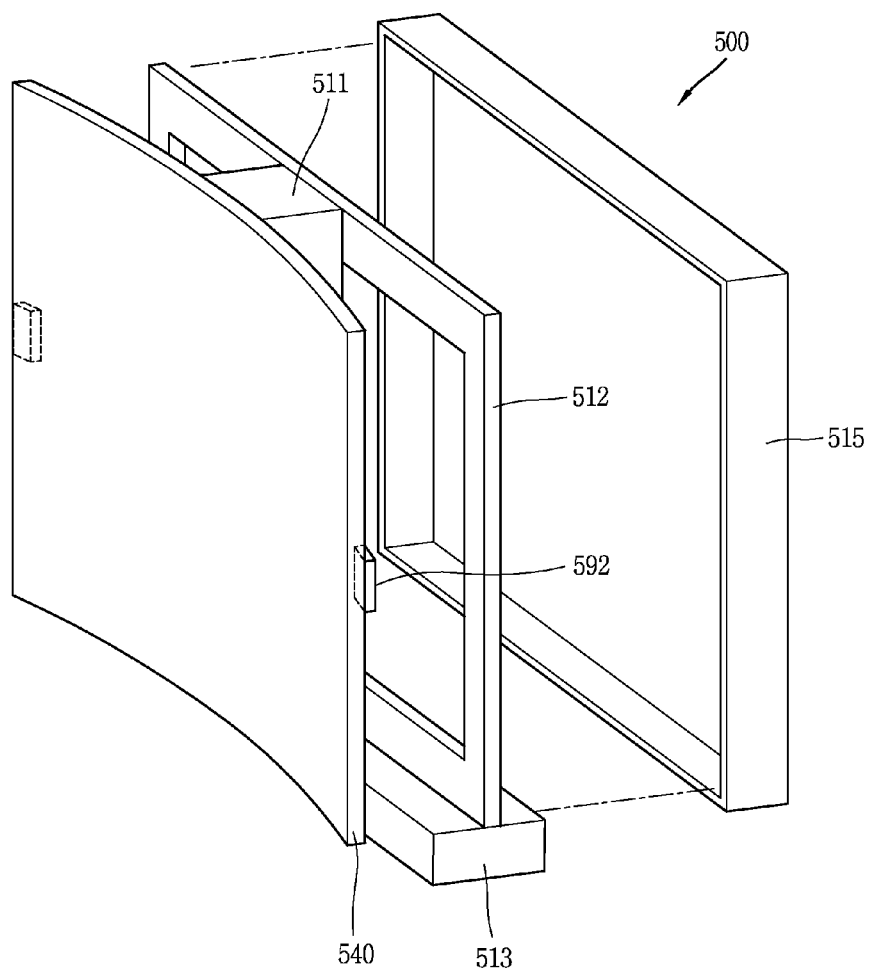
FIG. 12 is a conceptual view illustrating an image display device according to another exemplary embodiment of the present disclosure.

FIG. 12 is a conceptual view illustrating the image display device 500 according to another exemplary embodiment of the present disclosure.

The sensing unit may include an accelerometer 592. The accelerometer 592 is installed in a left or right end portion of the flexible display unit 540 to measure acceleration when the flexible display unit 540 is deformed.

Using the acceleration measured by the accelerometer 592, the controller 170 (see FIG. 1) determines a degree of bending of the flexible display unit 540. In detail, the controller 170 may perform a differential and integral calculus using the acceleration information provided from the accelerometer 592, and the controller 170 may control a speed and a position of the flexible display unit 540 based on the acceleration information.

Figure 13:
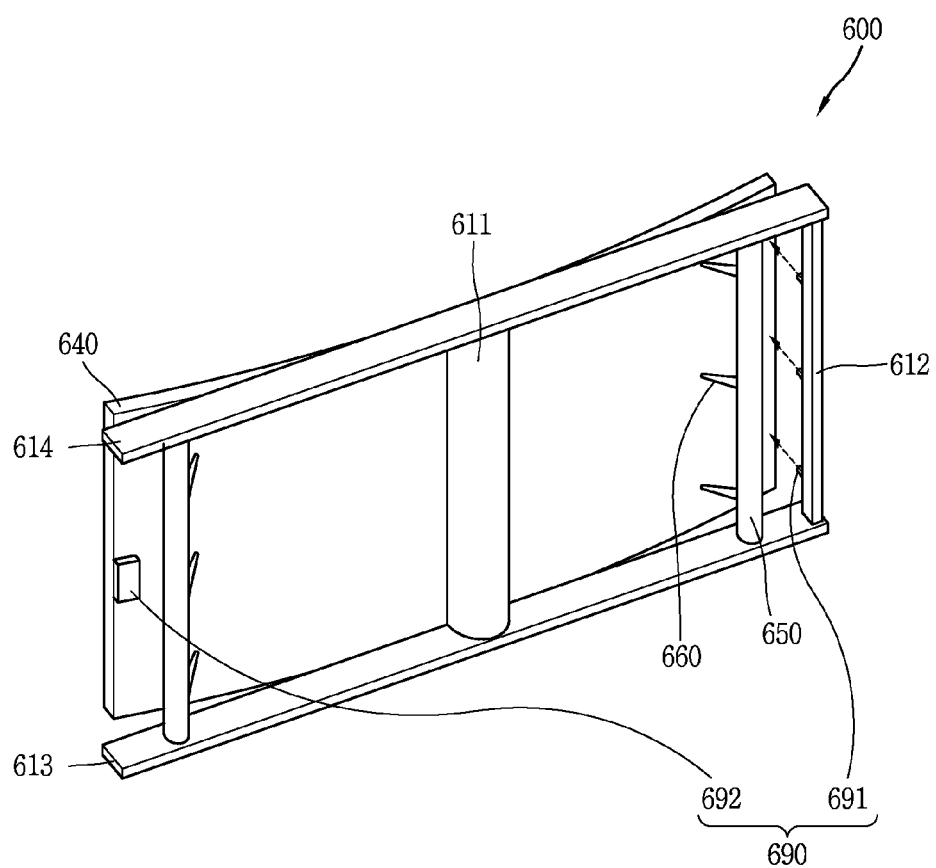
FIG. 13 is a conceptual view illustrating an image display device having a sensing unit described with reference to FIGS. 11 and 12.

FIG. 13 is a conceptual view illustrating the image display device 600 having the sensing unit 690 described with reference to FIGS. 11 and 12.

The driving unit illustrated in FIG. 13 includes poles 650 installed on left and right rear surfaces of the flexible display unit 640 and pressing members 660 are protruded from the respective poles 650. However, the image display device 600 of FIG. 13 is an example of employing a method of pressing the flexible display unit 640 from the left and right rear surfaces of the flexible display unit 640, and the present invention is not limited thereto.

The accelerometer 692 may be installed on the left or right rear surface of the flexible display unit 640. Also, the optical sensors 691 may be installed on the frame 612. FIG. 13 illustrates the application of both the accelerometer 692 and the optical sensor 691, but the present invention is not limited thereto and the image display device 600 may include only any one of the accelerometer 692 and the optical sensor 691.

As the poles 650 are rotated, the pressing members 660 press against the rear surfaces of the flexible display unit 640. Accordingly, the flexible display unit 640 may be bent. A principle of the accelerometer 692 and the optical sensor 691 and the stepwise variable control driving by the controller 170 (see FIG. 1) are the same or similar to that described above.

The present disclosure proposes different sensing units according to structures of implementing stepwise bending of the flexible display unit. According to an exemplary embodiment of the present disclosure, stepwise bending of the flexible display unit may be accurately implemented.

The image display device according to the embodiments of the present disclosure is not limited in its application of the configurations and methods, but the entirety or a portion of the embodiments can be selectively combined to be configured into various modifications.

According to the exemplary embodiments of the present disclosure configured as described above, since bending of a flexible display unit is sensed in a direct manner or indirect manner, a basis for determining a direction of driving force transmitted from the driving unit to the pressing member may be provided. Based on the degree of bending of the flexible display unit sensed by the sensing unit, the flexible display unit may be more accurately controlled in a stepwise manner.

Also, according to the exemplary embodiments of the present disclosure configured as described above, for the variable driving structure configured in the middle portion of the flexible display unit, a sensing unit that determines a degree of bending of the flexible display unit using a linear position sensor or a degree of bending of the flexible display unit based on a rotation angle of the driving motor or the lead screw may be provided.

Also, in the exemplary embodiments of the present disclosure configured as described above, for the variable driving structure configured in the left or right side of the flexible display unit, the sensing unit that determines a degree of bending of the flexible display unit using a linear position sensor, an optical sensor, an accelerometer may be provided.

Also, in the exemplary embodiments of the present disclosure configured as described above, bending of the flexible display unit may be controlled based on information regarding a radius of curvature of the flexible display unit continuously fed back from the sensing unit.

As the exemplary embodiment may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. An image display device comprising:
   a flexible display unit bendable by external force from a first state to a second state, the second state being a bent state;
   pressing members disposed on a rear surface of the flexible display unit and to apply the external force to the flexible display unit;
   a driving unit to generate a driving force to provide the external force to the pressing members such that the bending of the flexible display unit is implemented;
   a sensing unit to sense a degree of bending of the flexible display unit to provide a basis for determining a direction of the driving force, and
   adjusting units coupled to the respective pressing members,
   wherein the driving unit provides the driving force to the pressing members such that the pressing members move in a direction away from the driving unit or in a direction toward the driving unit based on the direction of the driving force,
   wherein a position of at least one adjusting unit corresponds with a degree of bending of the flexible display unit, and
   the sensing unit includes a linear position sensor connected with the adjusting unit to move with the adjusting unit,
   wherein the linear position sensor generates different electrical signals according to positions of the adjusting unit to sense a degree of bending of the flexible display unit based on the position of the adjusting unit.

2. The image display device of claim 1, wherein the driving unit is installed at the middle of the flexible display unit to push on or pull on the adjusting units, and the pressing members symmetrically extending in a horizontal direction from a side of the respective adjusting units and an end portion of the pressing members are coupled to respective end portions of the rear surface of the flexible display unit,
   wherein, as the driving unit pushes on the adjusting units, at least a portion of the pressing members bends to apply the external force to the rear surface of the flexible display unit.

3. The image display device of claim 2, further comprising:
   deformation limiting units to prevent the pressing members from parting away from the rear surface of the flexible display unit while being bent,
   wherein the respective deformation limiting unit is disposed between the end portion of the respective pressing member and the respective adjusting unit and coupled to the flexible display unit, while holding the respective pressing member to the rear surface of the flexible display unit.

4. The image display device of claim 1, wherein the driving unit comprises:
   a driving motor to generate the driving force along a driving shaft;
   a bevel gear to change the driving force along the driving shaft to the external force in a movement direction of the adjusting units; and
   a lead screw coupled to the bevel gear so as to be rotated by driving force of the driving shaft and screw-coupled with the adjusting units to move the adjusting units in a direction away from the driving unit or in a direction toward the driving unit according to a rotational direction of the driving shaft.

5. The image display device of claim 4, wherein each of the adjusting units comprises:
   a screw nut screw-coupled to the lead screw so as to relatively rotate with respect to the lead screw; and
   a moving body accommodating the screw nut, coupled to the pressing member, and slidably movable in a direction away from the driving unit or in a direction towards the driving unit according to relative rotation of the lead screw and the screw nut.

6. The image display device of claim 5, further comprising:
   a guide portion formed at the moving body to guide a sliding movement of the moving body.

7. The image display device of claim 5, wherein the screw nut has a manipulation portion located at one surface of the moving body and rotatably manipulable to be relatively moved with respect to the lead screw.

8. The image display device of claim 1, wherein the linear position sensor comprises:
   a housing installed at the rear surface of the flexible display unit;
   a link coupled to the adjusting unit to move together with the adjusting unit; and
   a linear switch having one end coupled to the link and the other end slidably movable within the housing according to the movement of the link,
   wherein the linear position sensor generates different voltages according to distances from a reference position to the linear switch.

9. The image display device of claim 4, wherein a rotation angle of the driving motor and a rotation angle of the lead screw vary according to a degree of bending of the flexible display unit, and
   the sensing unit senses a degree of bending of the flexible display unit based on at least one of a rotation angle of the driving motor and a rotation angle of the lead screw.

10. The image display device of claim 1, further comprising:
    a controller to control the driving unit to move the adjusting units,
    wherein when the controller receives a control command to change a degree of bending of the flexible display unit, the controller compares a target radius of curvature based on the control command and a current radius of curvature of the flexible display unit sensed by the sensing unit to determine a movement direction and a movement distance of the adjusting units.

11. The image display device of claim 10, wherein when the target radius of curvature based on the control command is smaller than the current radius of curvature sensed by the sensing unit, the controller controls the driving unit to move the adjusting units in a direction toward the driving unit, and when the target radius of curvature based on the control command is greater than the current radius of curvature sensed by the sensing unit, the controller controls the driving unit to move the adjusting units in a direction away from the driving unit.

12. The image display device of claim 10, wherein the controller continuously receive sensing information regarding a radius of curvature of the flexible display unit from the sensing unit until the controller determines that the radius of curvature of the flexible display unit has reached the target radius of curvature.

13. The image display device of claim 1, further comprising:
a rear cover to cover the rear surface and a lateral surface of the flexible display unit,
wherein driving unit includes a pole at a left side and another pole at a right side installed at a rear surface of the flexible display unit, and
pressing members on respective poles, wherein the pressing members apply the external force to the rear surface of the flexible display unit upon receiving the driving force from the driving unit.

14. The image display device of claim 1, wherein reference positions for distance measurement are set on the rear of left side and right side of the flexible display unit, and
the sensing unit includes a plurality of sensing units, wherein the sensing units are installed at the respective reference positions to measure distances from the respective reference positions to the respective rear surface of the flexible display unit.

15. The image display device of claim 14, wherein the distance from the rear surface of the left side or the right side of the flexible display unit to a reference position varies depending on a degree of bending of the flexible display unit, and
the sensing unit includes a linear position sensor to generate different electrical signals according to the distances to sense a degree of bending of the flexible display unit based on the distance from the rear surface of the left side or the right side of the flexible display unit to the reference position.

16. The image display device of claim 14, wherein the sensing units comprise of optical sensors to measure a distance from a left or right end portion of the rear surface of the flexible display unit to each of the reference positions using a laser or infrared ray.

17. The image display device of claim 16, wherein when the controller receives a control command for changing a degree of bending of the flexible display unit, the controller compares the target radius of curvature based on the control command and the current radius of curvature of the flexible display unit to determine an operation direction of the driving unit.

18. The image display device of claim 1, wherein the sensing unit comprises an accelerometer installed at a left end portion or a right end portion of the flexible display unit to measure acceleration when the flexible display unit is bending, and
a controller to determine a degree of bending of the flexible display unit using information provided from the accelerometer.

* * * * *